US012582129B2

(12) United States Patent (10) Patent No.: US 12,582,129 B2
Vilardell et al. (45) **Date of Patent: *Mar. 24, 2026**

(54) CARCASS STABILIZING SYSTEM

(71) Applicant: Equipements Frontmatec Inc.,
St-Anselme (CA)

(72) Inventors: Josep Serra Vilardell, Cardona (ES);
Kevin Bergeron, Saint-Anselme (CA)

(73) Assignee: Equipements Frontmatec Inc.,
St-Anselme (CA)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/925,379

(22) Filed: Oct. 24, 2024

(65) Prior Publication Data

US 2025/0049052 A1 Feb. 13, 2025

Related U.S. Application Data

(63) Continuation-in-part of application No. 17/955,852,
filed on Sep. 29, 2022, now Pat. No. 12,389,917.

(60) Provisional application No. 63/261,807, filed on Sep.
29, 2021.

(51) Int. Cl.
*A22C 17/00* (2006.01)
(52) U.S. Cl.
CPC ................................ *A22C 17/0093* (2013.01)
(58) Field of Classification Search
CPC ...................................................... A01K 97/10
USPC ......................................................... 452/179
See application file for complete search history.

(56) References Cited

U.S. PATENT DOCUMENTS

| | | | | |
|---|---|---|---|---|
| 3,412,424 A | * | 11/1968 | Brown ................. | A22C 17/004 |
| | | | | 452/138 |
| 4,189,806 A | * | 2/1980 | Van Heyningen ..... | A22C 17/12 |
| | | | | 452/134 |
| 5,076,417 A | * | 12/1991 | Santicchi ............... | B65G 47/61 |
| | | | | 198/465.4 |
| 5,135,101 A | * | 8/1992 | Dudley ................ | B65G 47/846 |
| | | | | 198/370.11 |
| 5,168,976 A | * | 12/1992 | Kettelson ............. | B23Q 16/008 |
| | | | | 193/35 A |
| 5,295,898 A | * | 3/1994 | Andre .................. | A22B 5/0005 |
| | | | | 452/134 |
| 6,699,116 B1 | * | 3/2004 | Gasbarro ............... | A22C 17/04 |
| | | | | 452/128 |

(Continued)

*Primary Examiner* — Richard T Price, Jr.
(74) *Attorney, Agent, or Firm* — GableGotwals

(57) ABSTRACT

A stabilization system for transporting products along a
processing line, for instance animal carcasses in a meat
processing plan, is provided. The system includes a stabi-
lizing surface along the processing line and along which the
products are transported. The system also includes one or
more stabilizers installed proximate the processing line
opposite the stabilizing surface and having an engagement
component and a shock absorbing device coupled to the
engagement component adapted to absorb at least some of
the impact forces resulting from the product being carried
down the processing line. The stabilizer includes an articu-
lated engagement component to engage the product, and
having stabilizer sections pivotally coupled to one another.
The stabilizer further includes one or more shock absorbing
devices coupled to the stabilizer sections. The shock absorb-
ing devices can generate a pressure on the stabilizer sections
as the products are transported to push the products against
the stabilizing surface.

20 Claims, 17 Drawing Sheets

(56)                    References Cited

U.S. PATENT DOCUMENTS

2005/0079815 A1*   4/2005  Johnson ............ A22C 17/0093
                                                452/150
2009/0241472 A1*  10/2009  Lindee ................. B65B 25/065
                                                53/391

* cited by examiner

CARCASS STABILIZING SYSTEM

CROSS-REFERENCE TO RELATED APPLICATIONS

This application is a continuation-in-part application of U.S. patent application Ser. No. 17/955,852 filed 29 Sep. 2024 which claims priority to U.S. Provisional Application No. 63/261,807 filed 29 Sep. 2021, each of which is incorporated herein by reference.

TECHNICAL FIELD

The present disclosure generally relates to the field of product stabilization, and more particularly relates to carcass stabilization systems in various environments, such as in a meat processing plant.

BACKGROUND

Known meat processing plants, such as those processing pigs, can operate processing lines at a capacity of about 1,100 pigs per hour, or higher. In order to process at these rates, the main chain operates at a fast linear speed to transport the pig carcasses along the processing line. Typical processing lines are not a single straight line, and therefore include bends and/or changes in direction. These changes in direction provide momentum (e.g., centrifugal force) to the transported product, which results in the product swinging in place, such as pig carcasses swinging on their hooks. Products/carcasses hanging from a rail, such as when using a chain, hooks and/or gambrels, will move, swing, rotate, etc., while being transported in the process.

Traditional meat processing equipment relies on proper positioning of the carcasses in order to generate accurate cuts and/or operation. A swinging piece of meat can, for example, be misread by a vision system and cause a miscut. For non-vision-guided equipment, it can be required to add complicated devices to the processing line and/or the equipment in order to limit movement and stabilize the carcasses. Moreover, a swinging piece of meat can, for example, make it difficult for workers and/or machines to perform various tasks, such as cutting the carcass. Equipment using robots (automated or not) can hardly be fitted with integrated stabilization mechanisms as this renders the robots cumbersome, overly complicated, too heavy and/or costly to maintain. Known systems include a separate stabilization mechanism on the opposite side of the robot, making the overall solution require more control systems, more parts, and is generally more complex to troubleshoot, among other issues.

There is thus a need to continue innovating and finding better and/or different ways of manufacturing, assembling and/or operating devices and systems to improve various types of product processing by providing improved stabilization.

Indeed, it would be particularly advantageous to provide an apparatus and/or a system, such as a stabilizing system for assisting in reducing movement of carcasses being processed in a more efficient, more precise, more accurate, more reliable, more adjustable, more versatile, more adaptable, more ergonomic and/or more desirable manner, than what is possible with available products and devices.

Thus, it would be particularly useful to be able to provide such an improved system which would be able to overcome or at the very least minimize some of known drawbacks and/or deficiencies associated with conventional methods, systems and/or devices, for example.

SUMMARY

According to an aspect, there is provided a stabilization system for products being transported along a processing line. The carcass stabilization system includes a stabilizing surface and a stabilizer. The stabilizing surface extends along the processing line along which the products are transported. The stabilizer is installed proximate the processing line opposite the stabilizing surface. The stabilizer includes an articulated plate and a plurality of shock absorbing devices. The articulated plate has a plurality of plate sections pivotally coupled to one another along the processing line, each articulated plate being adapted to engage the products. The plurality of shock absorbing devices is operatively coupled to the plurality of plate sections and are dynamically operable to generate a pressure on the plurality of plate sections as the products are transported along the processing line to push the products against the stabilizing surface.

According to an embodiment, each shock absorbing device comprises a pneumatic cylinder configured to generate the pressure on the plurality of plate sections in order to position each plate section in a predetermined position relative to at least one of the stabilizing surface and the products being transported.

According to an embodiment, the pressure is substantially constant.

According to an embodiment, the predetermined position includes a predetermined distance between each plate section and the stabilizing surface.

According to an embodiment, the predetermined distance is the same for each plate section.

According to an embodiment, the pneumatic cylinder comprises a pneumatic cylinder rod and a pneumatic cylinder housing, and the pneumatic cylinder rod is adapted to: retract within the pneumatic cylinder housing as the products contact corresponding plate sections; and extend out of the pneumatic cylinder housing to apply the pressure on the plate section to push the product against the stabilizing surface.

According to an embodiment, the stabilizing surface comprises a conveyor belt adapted to urge the products in the direction of the processing line.

According to an embodiment, each shock absorbing device of the plurality of shock absorbing devices is operatively coupled to at least one plate section, respectively.

According to an embodiment, the plurality of shock absorbing devices extend perpendicularly relative to the at least one plate section operatively coupled thereto.

According to an embodiment, each plate section of the plurality of plate sections are pivotally coupled to adjacent plate sections defining pivot points, and wherein the plurality of shock absorbing devices is coupled to the plurality of plate sections at the pivot points.

According to an embodiment, the plurality of plate sections comprises an upstream plate section having a distal end extending at an angle relative to the stabilizing surface.

According to an embodiment, the distal end extends away from the stabilizing surface defining a wider upstream portion of the stabilization system.

According to an embodiment, the plurality of shock absorbing devices comprises an upstream shock absorbing device operatively coupled to the distal end of the upstream plate section.

According to an embodiment, the upstream shock absorbing device is perpendicular relative to the distal end of the upstream plate section.

According to an embodiment, the distal end of the upstream plate section is arcuate, and a proximal end of the upstream plate section is generally parallel to the stabilizing surface.

According to an embodiment, the stabilizer is a first stabilizer, and the stabilization system further comprises a second stabilizer installed adjacent the first stabilizer along the processing line, the first and second stabilizers defining a dual-stage stabilization sequence where the first and second stabilizers engage the products simultaneously or in succession.

According to an embodiment, the first and second stabilizers are identical.

According to an embodiment, the articulated plate and the stabilizing surface are configured to squeeze the products therebetween.

According to an embodiment, the products include animal carcasses, and the articulated plate and the stabilizing surface are configured to squeeze a predetermined portion of the animal carcasses to provide substantially consistent carcass orientation along the processing line.

According to an embodiment, the predetermined portion of the animal carcass has an oblong cross-sectional shape having a greater length than width, and wherein squeezing the predetermined portion orients the animal carcasses to align the length of the predetermined portion with the processing line.

According to another aspect, a stabilization system for products being transported along a processing line is provided. The stabilization system includes a stabilizing surface extending along the processing line and along which the products are transported; and a stabilizer installed proximate the processing line opposite the stabilizing surface. The stabilizer has an articulated engagement component having a plurality of stabilizer sections pivotally coupled to one another along the processing line, each stabilizer section being adapted to engage the products; and a plurality of shock absorbing devices operatively coupled to the plurality of stabilizer sections and dynamically operable to generate a pressure on the plurality of stabilizer sections as the products are transported along the processing line to push the products against the stabilizing surface.

DETAILED DESCRIPTION

Figure 1:
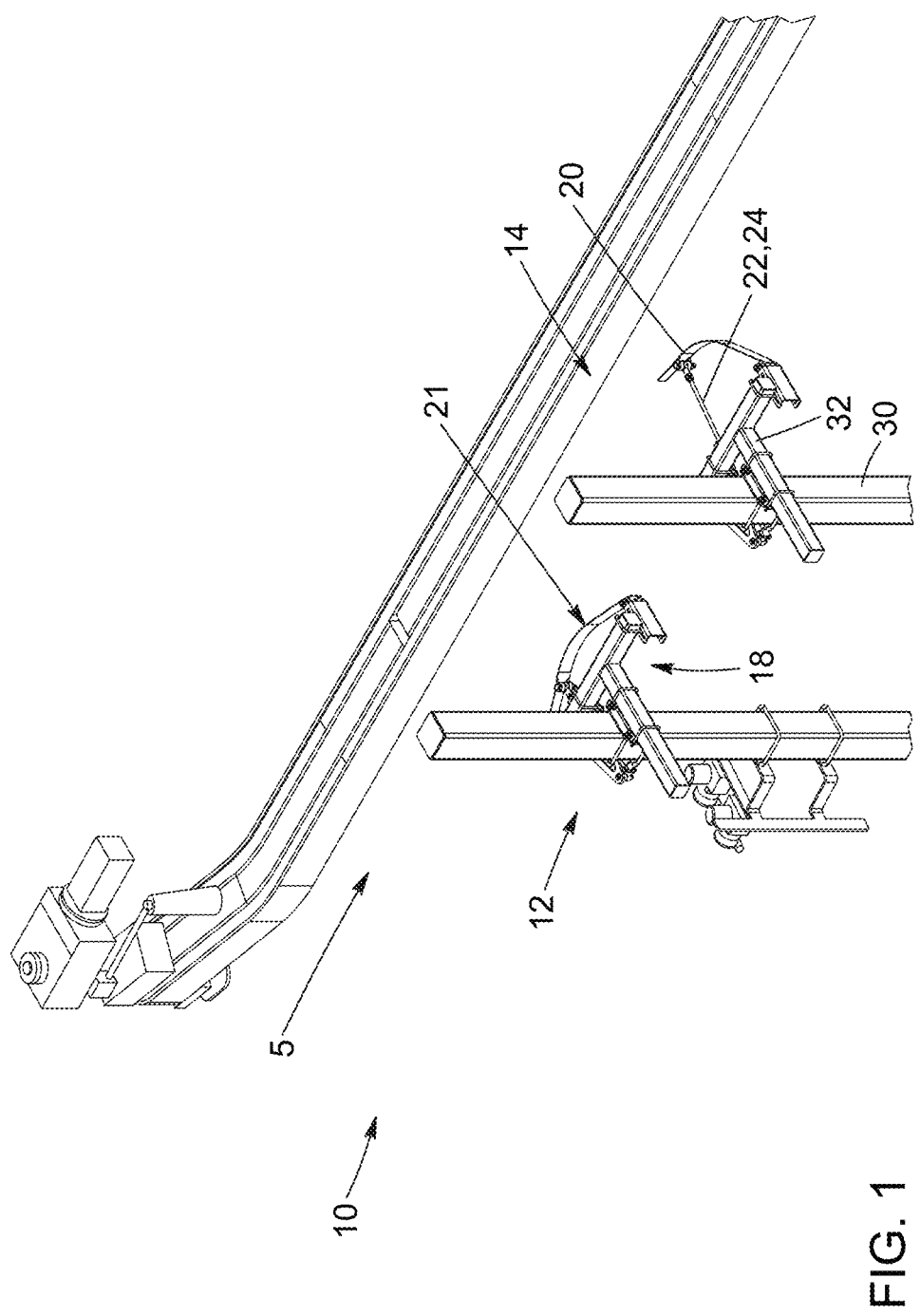
FIG. 1 is a perspective view of a stabilization system according to an embodiment, showing a pair of stabilizers and a conveyor mounted proximate a processing line.

As will be explained below in relation to various embodiments, the present disclosure described apparatuses, systems and methods for stabilizing items being conveyed, for example, as part of a processing line. More specifically, the present disclosure relates to a carcass stabilization system adapted to prevent, or at least reduce movement of carcasses (e.g., animal carcasses such as pigs) being conveyed and processed along a processing line of a slaughterhouse.

The stabilization system can include stabilizers adapted to interact with carcasses being conveyed, or otherwise transported, for example, on hooks or gambrels, and which are thereby prone to sway as they are moved along a processing line, to reduce movement of the carcasses on their respective hooks. The stabilizers can be installed along the processing line, such as proximate locations which can induce additional swinging (e.g., near corners or sharp turns of the processing line) and include one or more shock absorbers to have the carcasses abut thereon. The shock absorbers are adapted to absorb at least some of the forces from the impacting carcass, thereby reducing (or eliminating) the subsequent swinging motion of the carcass as it moves away from the stabilizers.

In one embodiment, the stabilization system includes a stabilizing surface provided opposite the stabilizers such that the carcasses are displaced along the processing line between the stabilizing surface and the stabilizers. Each shock absorber can include an engagement component, such as a belt or a plate, extending alongside the processing line and against which the carcasses can abut, and a shock absorbing device, such as a pneumatic cylinder, coupled to the plate and configured to generate/apply a substantially constant pressure on the plate. As such, the forces applied to the plate (e.g., from the swinging carcasses) are at least partially countered and/or absorbed by the shock absorbing device in order to reduce the subsequent swinging motion of the carcasses. Moreover, and as will be described further below, the pressure provided by the shock absorbing device on the plate can push and/or maintain the carcass in contact with the stabilizing surface to further reduce movement of the carcass. In some embodiments, the stabilizing surface includes a lateral conveyor configured to urge, or otherwise help the forward movement of the carcasses along the processing line as the carcasses are stabilized between the lateral conveyor and the shock absorbers.

In another embodiment, each stabilizer can include a plurality of shock absorbers, where the engagement component of each shock absorber is connected to at least one other engagement component, such as the engagement component of adjacent shock absorbers, for example. The plurality of interconnected engagement components define an articulated plate extending along the processing line and cooperating with a plurality of shock absorbing devices. Therefore, the movement of one engagement member (e.g., from impacting carcasses) can cause an adjacent engagement member to move in a corresponding manner. In other words, the articulated plate can dynamically move at one or more locations along its length to better adapt to the carcasses being transported along the processing line. The dynamic movement and improved adaptation of the articulated plate can in turn improve the prevention, or at least the reduction of movement of transported carcasses.

The stabilizers can include a pair of shock absorbers installed adjacent one another along the processing line to define a dual-stage stabilization sequence. In this case, it is noted that the dual-stage stabilization sequence includes a first reduction of movement (e.g., from the first absorber) followed by a second reduction of movement (e.g., from the second absorber), although other configurations are possible and may be used, such as having the pair of shock absorbers positioned so as to engage the same carcass at substantially the same time, for example.

The stabilization system can thus be configured to provide more stable carcasses in processing lines of slaughterhouses, which can facilitate operations of machines further along the processing line, such as machines configured to cut the carcasses, for example. The stabilization system can accomplish these functions, among others, in a simpler, easier, faster, more accurate, more effective, more functional, more reliable and/or more versatile manner than what is possible with other conventional devices and/or apparatus.

Figure 2:
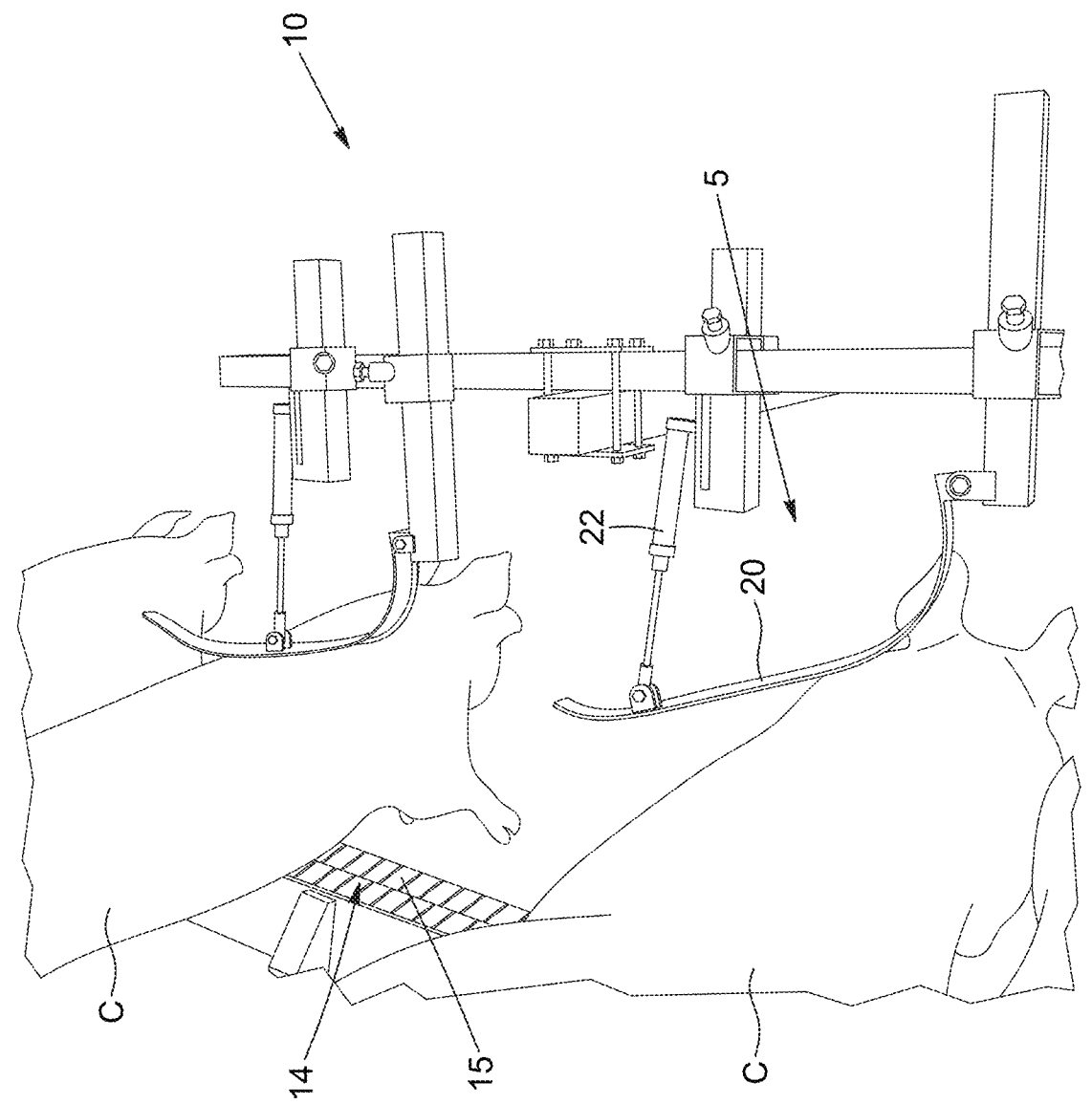
FIG. 2 is a top perspective view of the stabilization system shown in FIG. 1, showing animal carcasses being transported along the processing line and being engaged by the stabilizers, according to an embodiment.

With reference to FIGS. 1 and 2, a stabilization system 10 is shown according to an embodiment. In this embodiment, the stabilization system 10 can be installed along a processing line 5 of a factory, for example, and is configured to stabilize the product(s) being conveyed, carried or otherwise displaced along the processing line 5. In the context of the present disclosure, the product is an animal carcass C, and the factory is a slaughterhouse such that the processing line includes animal carcasses C hanging from hooks and being carried along a processing path. However, it should be noted that the stabilization system 10 can be used for other types of products and/or as part of other types of factories through which various products are conveyed (on hooks or not). For example, the stabilization system 10 can be used to stabilize products being conveyed along a conveyor belt.

Figure 12:
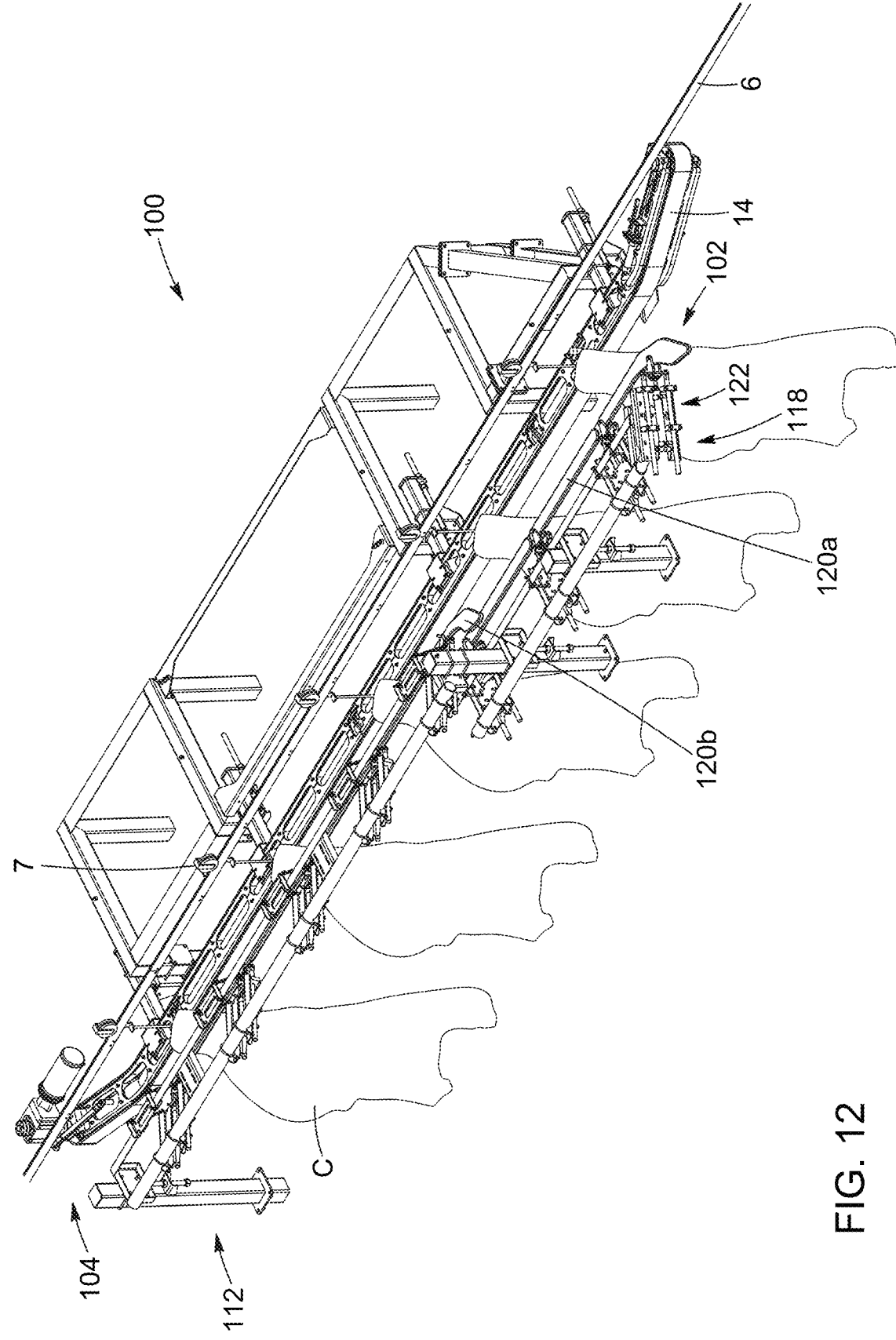
FIG. 12 is a perspective view of a stabilization system in accordance with another embodiment, showing a pair of stabilizers having shock absorbing devices interconnected with an engagement plate, a conveyor, a robotic arm, and carcasses.
Figure 13:
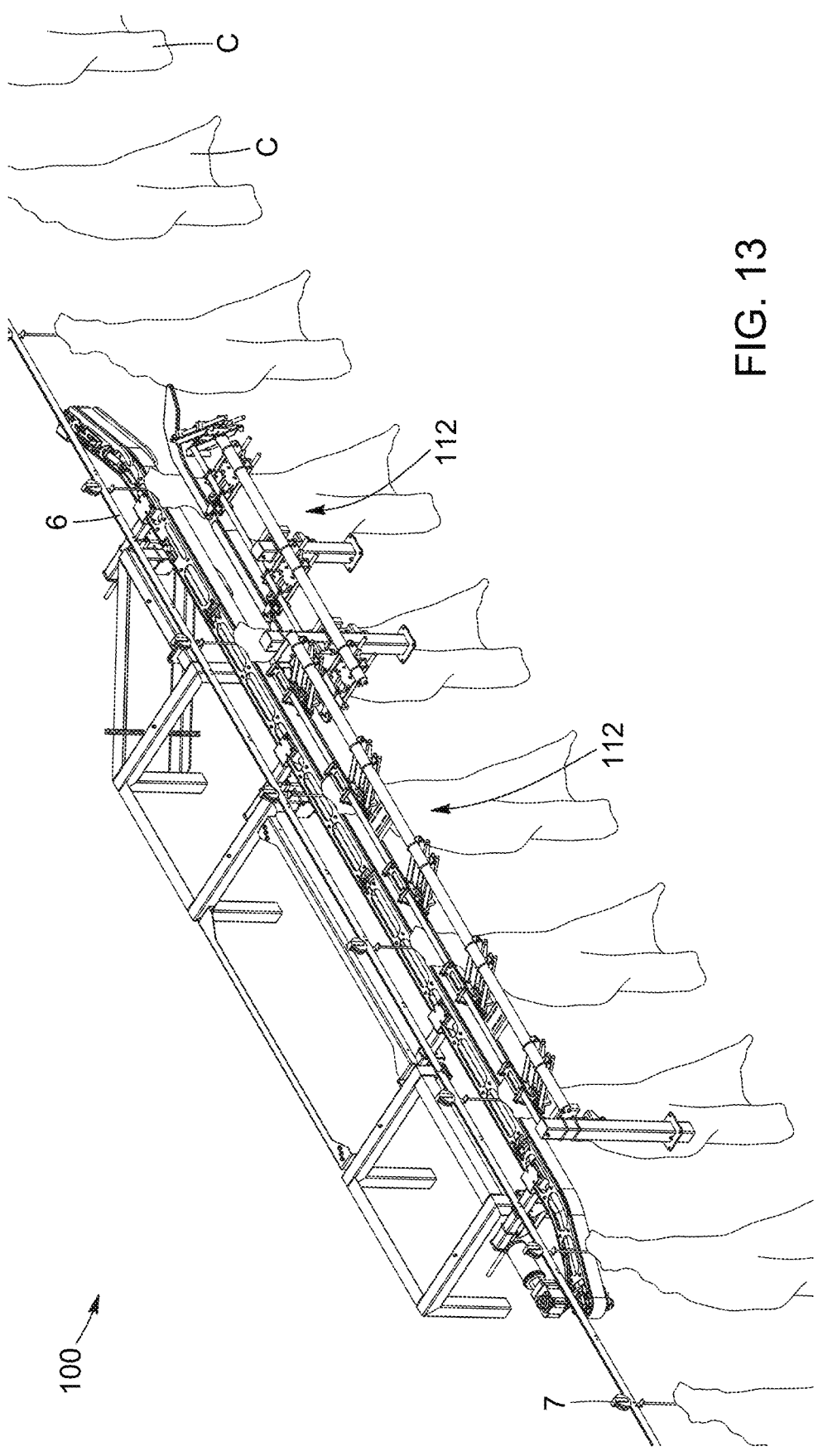
FIG. 13 is another perspective view of the stabilization system shown in FIG. 12.
Figure 14:
FIG. 14 is yet another perspective view of a portion of the stabilization system shown in FIG. 12, showing a carcass being engaged by one stabilizer having interconnected shock absorbing devices against the conveyor.

It is noted that products (e.g., animal carcasses) hanging from hooks and/or transported on a chain are subject to certain undesired movements, such as swinging and/or rotational motion, as they are moved forward along the processing line. It should therefore be understood that the stabilization system 10 is adapted to prevent, or at least reduce, these undesired movements in order to provide a more stable product along the processing line. As illustrated in FIGS. 12 to 14, the processing line can include a rail 6 installed above and generally aligned with the processing path. Wheels 7 can be attached to carcass hooks and mounted onto the rail 6 to carry carcasses C down the processing line.

Figure 3:
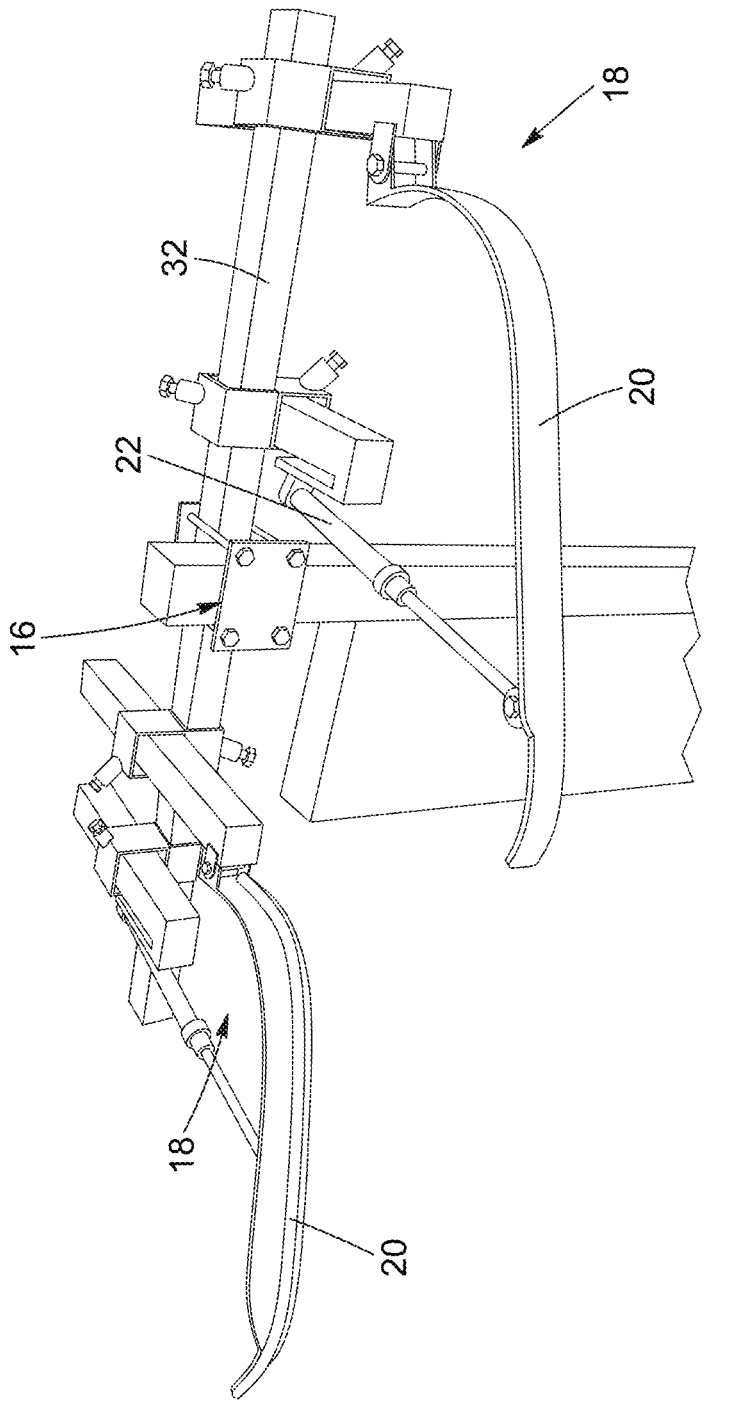
FIG. 3 is a front perspective view of the stabilization system shown in FIG. 1, showing each stabilizer having a plate extending forward and adapted to engage transported carcasses, according to an embodiment.
Figure 4:
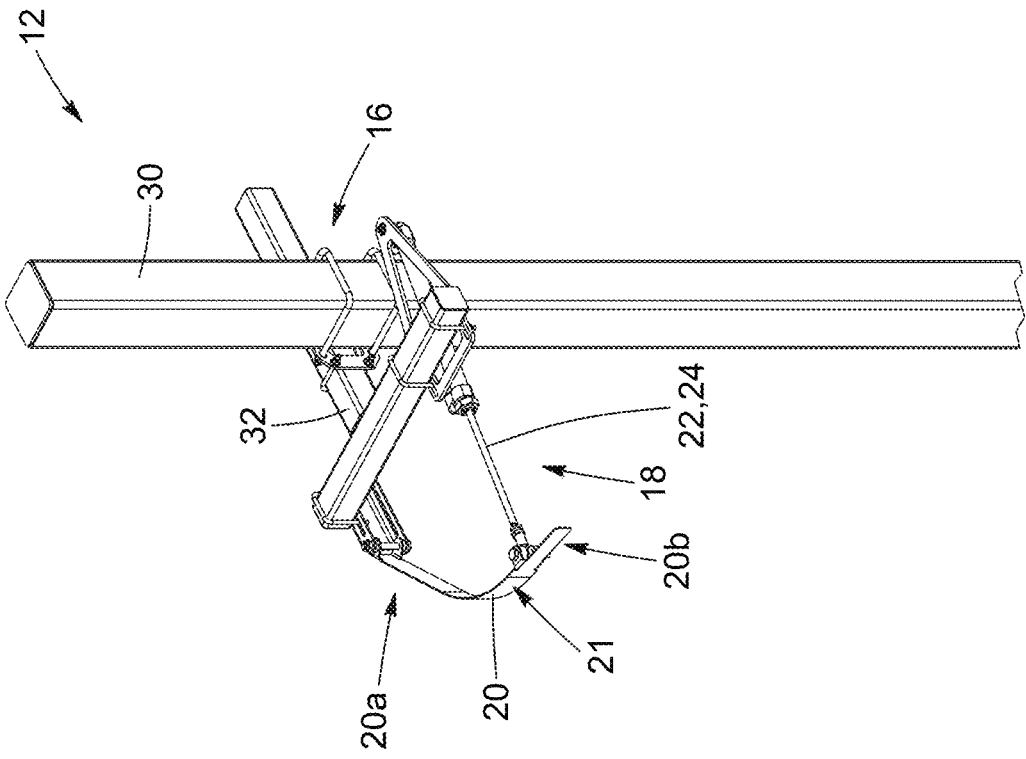
FIG. 4 is a perspective view of a stabilizer of the stabilization system shown in FIG. 1, showing a shock absorber coupled to the plate, according to an embodiment.

With reference to FIGS. 3 and 4, in addition to FIGS. 1 and 2, the stabilization system 10 includes one or more stabilizing tools, or "stabilizers" 12 operable to engage the carcasses to reduce movement thereof on their hooks (e.g., reduce swinging). The stabilization system 10 further includes a stabilizing surface 14 installed opposite the one or more stabilizers 12 such that the carcasses are carried along the processing line between the stabilizing surface 14 and the stabilizer(s) 12. The carcasses can contact the stabilizers 12 on a first side of the processing line, and the stabilizing surface 14 on the opposite side of the processing line. Therefore, it is noted that movement in a direction generally perpendicular to the processing line is prevented due to the presence of the stabilization system 10 components.

In some embodiments, the stabilizer 12 includes a support member 16 provided proximate the processing line 5, and a shock absorber 18 coupled to the support member 16. The shock absorber 18 is adapted to absorb at least some of the forces generated from moving (e.g., swinging) carcasses which engage or otherwise come into contact with the stabilizers 12. It should be understood that absorbing at least some of the forces can facilitate stabilizing the carcass since the swinging motion of the carcass is reduced after having engaged the stabilizer 12. In this embodiment, the shock absorber 18 includes a plate 20 having an engagement surface 21, and a shock absorbing device 22 operatively coupled to the plate 20. During operation, the carcasses are carried along the processing line and engage (e.g., impact) the engagement surface 21, with the shock absorbing device 22 being configured to absorb at least some of the forces from the contact/impact.

In some embodiments, the shock absorbing device 22 is configured to generate a generally constant pressure on the plate 20 to maintain the plate in a predetermined position. The shock absorbing device 22 can also enable movement of the plate 20, such as when the forces from the impact of the carcass on the engagement surface 21 (i.e., on the plate 20) are greater than the pressure generated by the shock absorbing device 22. As such, the initial impact of the carcass against the engagement surface 21 can displace the plate 20 in a corresponding and/or predetermined direction, and the shock absorbing device 22 subsequently reverts the plate in its initial position (e.g., the predetermined position) via the pressure being applied to the plate. As seen in FIGS. 1 and 2, the predetermined position of the plates 20 can include positioning the plates 20 at a predetermined distance from the stabilizing surface 14 such that the carcasses engage the plates 20, the stabilizing surface 14 or both.

In this embodiment, the shock absorbing device 22 includes a pneumatic cylinder 24 having a retractable rod configured to apply the pressure on the plate 20, and retract into a cylinder housing when the forces applied on the engagement surface 21 (e.g., from carcass impacts) are greater than the generated pressure. It is appreciated that other configurations and/or devices are possible and may be used to generate a substantially constant pressure on the plate 20. For example, the stabilizers can alternatively, or additionally, include devices such as spring(s), servo motor-driven mechanism(s), or any combination thereof to generate pressure or apply a force on the plate 20. It should also be noted that, in some embodiments, the stabilizers 12 can have no shock absorbing device coupled to the plate 20, in which case the plate would be shaped, sized, positioned and/or made of resilient material adapted to keep its shape and generally maintain its position on the processing line. It is thus noted that, in some embodiments, the shape, size, position and/or material of the plate can be adapted to absorb some of the forces from impacting carcasses, and can therefore assist the shock absorbing device 22 in stabilizing the carcasses.

Still with reference to FIGS. 1 to 4, the plate 20 of the stabilizer 12 can be arcuate, straight, or a combination thereof. In this embodiment, the plate 20 can have an elongated shape (similar to a belt or a strip) having a proximal end 20a connected to the support member 16, and a distal end 20b extending forwardly from the support member 16 and being coupled to the shock absorbing device 22 (e.g., to the retractable rod of the pneumatic cylinder 24). The plate 20 can have a portion thereof (e.g., a proximal portion) be arcuate to enable the plate to extend from the support member 16 and position its distal end 20b in front and in a spaced-apart manner relative to the support member 16. The plate can have another portion thereof (e.g., a distal portion) be relatively straight, such as substantially parallel to the direction of the processing line, for example.

The plate can alternatively be misaligned with the direction of the processing line, such as being diagonal or the like, which can apply pressure progressively along the carcass and/or adapt to varying carcass lengths. It should be noted that, as used herein, the expression "apply pressure progressively" can refer to the configuration of the plate enabling the application of incremental forces or pressure on the carcass when it engages the plate as the carcass passes by the stabilization system. The incremental force can increase or decrease as the carcass moves (e.g., slides) along the plate 20, as required.

The engagement surface 21 of the plate 20 can be defined across the proximal portion, the distal portion, or both (i.e., across the entire outer surface of the plate). It is appreciated that an arcuate shape can provide a "spring" effect to the carcasses impacting on the plates 20, such that the geometry/configuration of the plates can assist in absorbing some of the impact forces.

As seen in FIG. 4, the plate 20 can be generally flat, although other configurations are possible. The plate 20 can be made of any suitable material, such as a metallic material, a resilient material and/or a plastic, for example. In some embodiments, the engagement surface 21 can be smooth (e.g., no bumps or protrusions) such that the carcasses can impact the engagement surface 21 and slide along the length of the surface and off the plate 20. In other embodiments, the engagement surface 21 can be adapted to at least partially grip onto the carcasses, for example, to stop a forward swinging motion. In such embodiments, the engagement surface 21 can be provided with a "sandpaper-like" texture along a portion of or the entire surface area of the engagement surface. Any other suitable configuration and/or texture of the engagement surface 21 can alternatively, or additionally be used. For example, the engagement surface can have at least a portion thereof with a cone top configuration, a nub top configuration, a diamond plate, a ribbed configuration, etc.

In some embodiments, the stabilizers 12 can have other absorbing plate designs (e.g., other than the generally flat or smooth curved steel plate), such as rollers, round bar(s), curved round bar(s), small conveyor(s), resilient components, etc. As will be described further below, multiple stabilizers can be installed proximate one another along the processing line, and each stabilizer can have the same configuration or respective configurations, with their own absorbing plate and/or shock absorption configuration.

In some embodiments, the support member 16 includes a post 30 installed proximate (e.g., adjacent) the processing line, and a support frame 32 connected to the post 30. The plate 20 and the shock absorbing device 22 can be coupled to the support frame 32, which is in turn adjustably connected to the post 30. The position of the support frame 32 relative to the post 30 can therefore be adjusted, which correspondingly adjusts the position of the plate 20 and the shock absorbing device 22. For example, the support frame 32 can move up and down the post 30 to enable positioning the plate at desired heights (e.g., to have specific parts of a carcass engage the plate), perpendicularly relative to the post (e.g., move left or right), tilt in one or more directions, pivot about the post 30, etc. Having an adjustable support frame 32 can facilitate fine tuning the stabilizers to increase efficiency thereof, for example.

Figure 6:
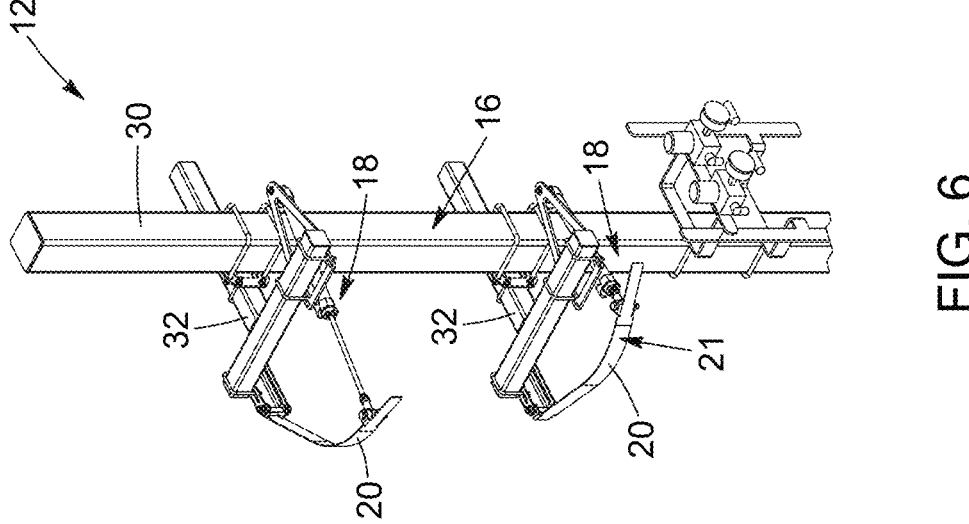
FIGS. 5 and 6 are perspective views of alternate embodiments of the stabilizers of the stabilization system, showing different configurations of the plates and shock absorbers.
Figure 5:
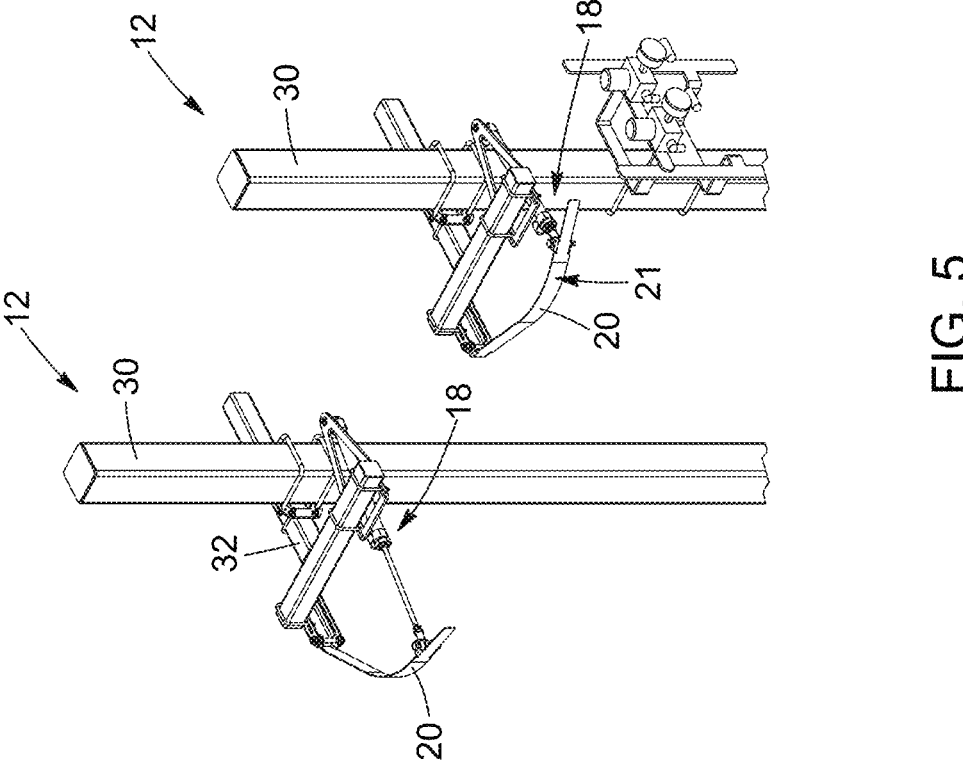

With reference to FIGS. 5 and 6, the stabilization system 10 can include a plurality of stabilizers 12 installed proximate one another along the processing line. For example, the stabilizers 12 can be mounted subsequently (one after the other) along the processing line, for example, at generally the same height or at varying heights (seen in FIGS. 2, 3 and 5). Some stabilizers can alternatively, or additionally, be at the same location but positioned at varying heights (seen in FIG. 6). In the embodiment of FIG. 5, the stabilizers 12 define a dual-stage stabilization system, where, as the swinging carcasses comes down the processing line, the first stabilizer will engage with the carcasses (e.g., the swinging carcasses impact against the first stabilizer), while the stabilizing surface 14 provides a stable surface against which the carcasses are pressed (e.g., via the plate and pneumatic cylinder). The initial contact of the carcass against the plate can displace the absorber by pushing the retractable rod into the cylinder housing, but because of the configuration of the pneumatic cylinder, the constant pressure generated pushes the carcass back toward and against the stabilizing surface.

Once the carcass moves past and disengages the first stabilizer, the carcass engages with the second stabilizer which also pushes on the carcass toward the stabilizing surface. This second push further stabilizes the carcass by reducing the swinging movement thereof. The stabilizers 12 can include respective shock absorbers 18 having the same configuration or respective configurations. In some embodiments, the first stabilizer can be configured to absorb higher forces than the second stabilizer. For example, the first stabilizer can be adapted to generate greater pressures than the second stabilizer. Moreover, the plate of the first stabilizer 12 can be more flexible than the plate of the second stabilizer to compensate for higher force impacts, whereas the second plate can be more rigid since the impacts on the second shock absorber 18 can generate less force than on the first shock absorber 18.

In some embodiments, the stabilizing surface 14 can run parallel to the processing line and facilitate movement of the carcasses along said processing line. For example, the stabilizing surface 14 can include a lateral conveyor 15, as seen in FIGS. 1 and 2, operable to move the carcasses along the processing line. It should be noted that the carcasses are hanging from chains/hooks which transport the carcasses along the processing line. As the hooks transport the carcasses down the processing line, the stabilizers are adapted to push the carcasses against the lateral conveyor which assists in displacing the carcasses in the direction of the hooks (i.e., in the direction of the processing line). It should be understood that the conveyor includes a conveyor belt configured to urge the carcasses along the processing line.

The conveyor belt can be installed opposite the stabilizers at any suitable height. For example, the conveyor belt can be positioned at a hind leg level, for example. It is noted that the conveyor can be adjustable in order to selectively position the conveyor belt at a desired vertical level relative to the stabilizers and/or the processed animal carcasses. In some embodiments, the stabilization system 10 can include stabilizing devices positioned opposite the stabilizers 12 in addition to, or instead of the conveyor 15. For example, stabilization system 10 can include a first conveyor on the breast or bottom part of hanging carcasses, while a second conveyor could be used to stabilize the gambrels in the leg area or upper part of the hanging carcasses.

In some embodiments, the stabilizers are installed at various locations along a processing line of a factory or slaughterhouse. For instance, it can be desirable to stabilize the products (e.g., the carcasses) prior to moving them to be processed by manual and/or automated operations. Operations such as cuts using machines like a neck clipper, belly/breast bone opener, bunger, leaf lard puller, backfinner, back splitter, leg cutter, etc., or other tasks such as a carcass printer can be performed in quick succession from one carcass to another. It is appreciated that a part that is moving/swinging continuously in a non-predictive and/or non-constant fashion can be challenging to cut in the desired manner. Depending on the operation, movement of the carcasses can cause a miscut resulting in contamination and possible meat loss or downgrade. Although known devices can achieve an acceptable level of cut quality/accuracy while the carcasses are moved, they are not adapted to cut a carcass that moves and rotates/swings at the same time, which can result in damage to meat parts, tool breakage, etc. For instance, computer-implemented programs, vision systems (e.g., X-rays), control systems for robots, etc., are less efficient and/or more complicated to operate, especially in real-time, when carcasses are moving, swinging and/or rotating.

Figure 8:
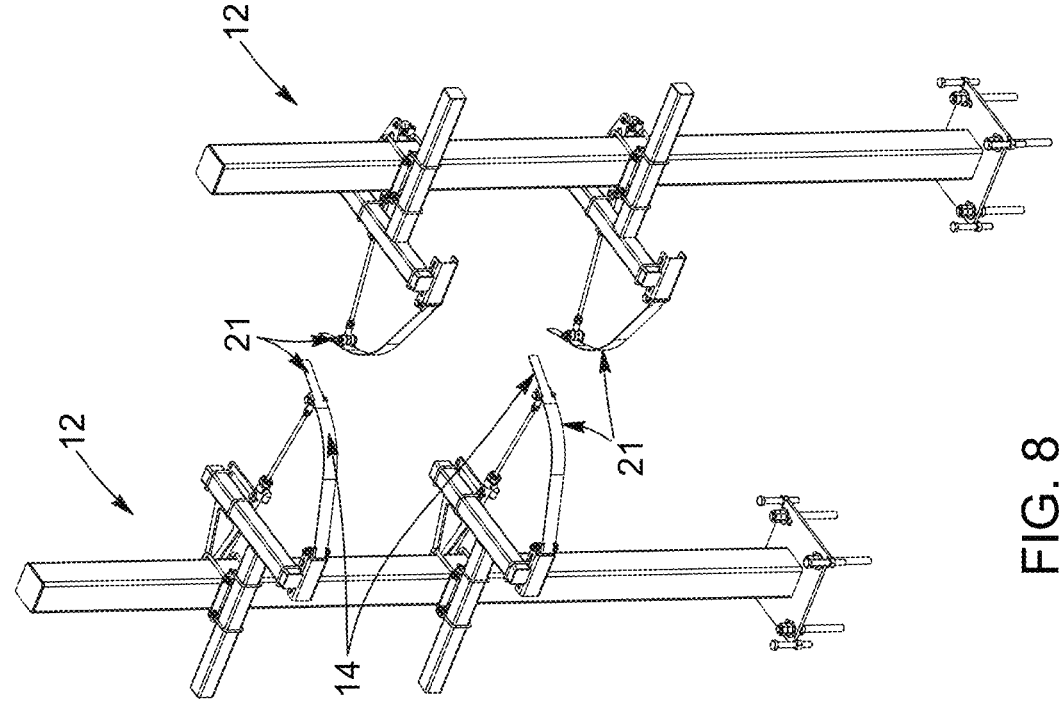
FIGS. 7 and 8 are perspective views of alternate embodiments of the stabilization system, showing one or more stabilizers mounted opposite one another to stabilize carcasses on either side thereof.
Figure 7:
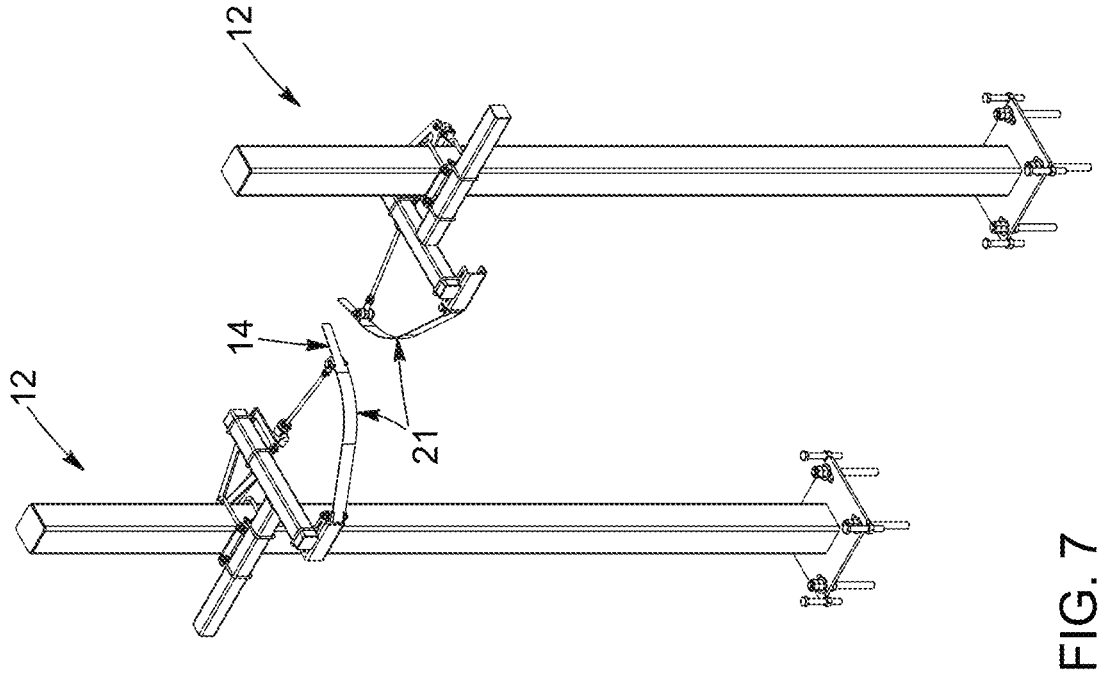

Alternatively, and as seen in FIGS. 7 and 8, the stabilization system 10 can include at least one pair of stabilizers 12 (e.g., secondary stabilizers 12) installed opposite one another across the processing line, for example, so as to have one or more stabilizers on each side of the moving carcasses. The stabilizers 12 can be installed directly in front of one another to stabilize the carcass simultaneously, or staggered along the processing line to stabilize the carcass in quick succession. It should thus be noted that, in such embodiments, the stabilizing surface 14 can correspond to the engagement surface 21 of at least one of the stabilizers installed opposite the processing line.

Similarly, vision systems or measuring systems, such as scanners and x-ray machines, can be improved by previously stabilizing the product to be scanned. For example, a stable animal carcass can be more accurately measured and evaluated when compared to a swinging, moving and/or rotating carcass. Manual labor can also be improved by stabilizing the carcasses, where excessive movement or momentum of the carcasses can cause issues for workers.

It should be appreciated from the present disclosure that the various embodiments of the stabilization system 10 therefore provide several advantages over conventional systems, devices and/or apparatus in that: a) it facilitates cooperative work between machines and humans by providing a stable product/work surface; b) it facilitates operation of vision systems and measurements of the product; c) it can be adapted for products of varying shapes, sizes and from different industries; d) it facilitates automated and/or manual operations performed on the product along the processing line, which leads to end products of higher quality; e) it facilitates automated and/or manual operations performed on the product along the processing line, which leads to less damage to the equipment and/or to the product; f) it facilitates automated and/or manual operations performed on the product along the processing line, which leads to less loss of product (accidental or not); g) reducing swinging and/or rotational movement of the transported product enables operation of processing lines at higher speeds (e.g., more products per hour moving along the processing line); h) etc.

As may now be better appreciated, the stabilization system 10 of the present disclosure can be advantageous in that it provides a system capable of stabilizing various products on a processing line in a more efficient, more precise, more accurate, more reliable, more adjustable, more versatile, more adaptable, more ergonomic and/or more desirable manner, than what is possible with other existing conventional devices.

The described example embodiments are to be considered in all respects as being only illustrative and not restrictive. For example, in the embodiments illustrated in the accompanying drawings, the product being stabilized by the stabilization system consists of pig carcasses. However, it is noted that other types of carcasses can be used, such as cattle, lamb or chicken, or any other suitable product which includes parts hanging from chains and/or hooks along a processing line, and which requires stabilization. The stabilization system can also be used in various processing areas of a meat processing plant such as cut floors, fabrication floors and/or deboning rooms where a part has excessive or undesired movement and requires stabilization. For example, the loin drop operation (i.e., the cut between round and sirloin) is performed in cattle fabrication rooms and may require stabilization for an accurate cut. The processing lines for the round and the chuck cuts are also examples of products that could require stabilization. In pork cut or deboning floors, stabilization could be required for hanging shoulder deboning as well as hanging ham deboning.

Figure 10:
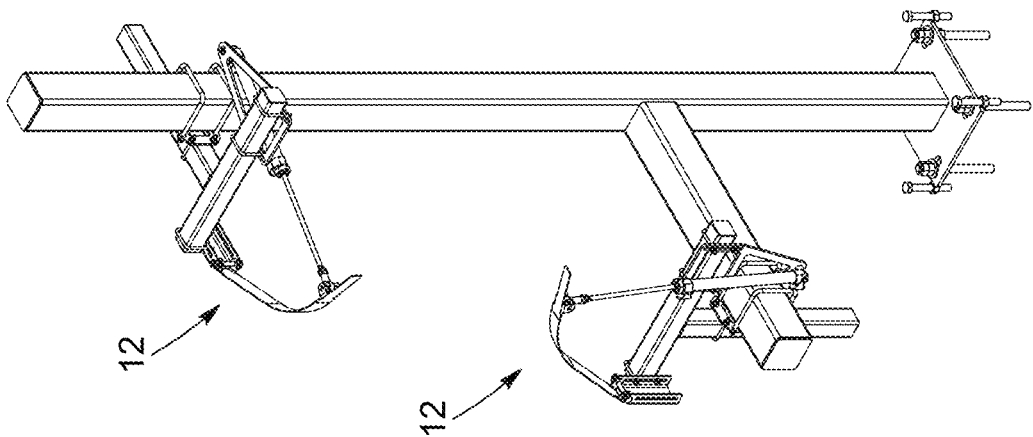
FIGS. 9 and 10 are perspective view of an alternate embodiment of the stabilization system, showing at least a second stabilizer adapted to stabilize a carcass along a different axis relative to a first stabilizer.
Figure 9:
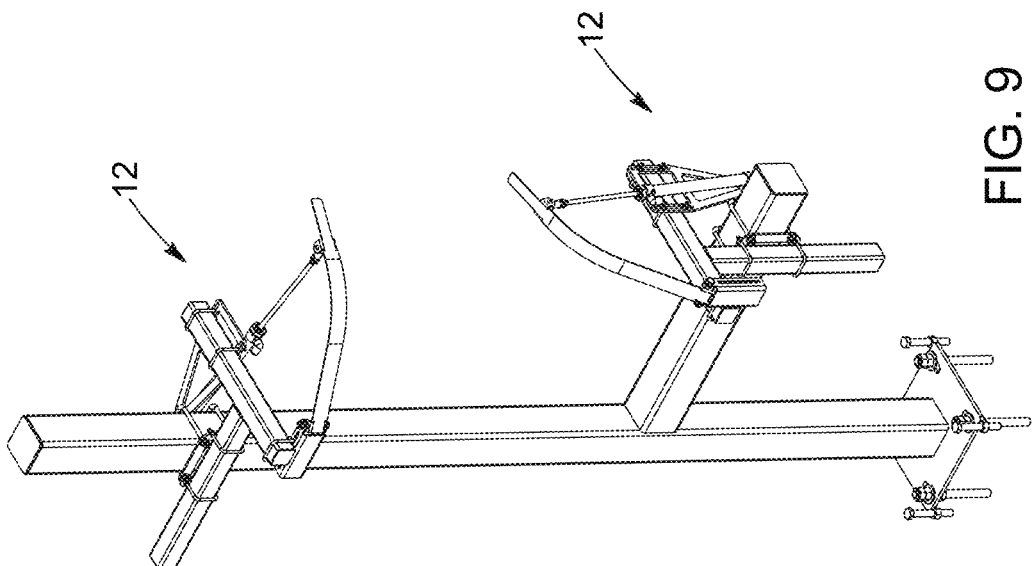
Figure 11:
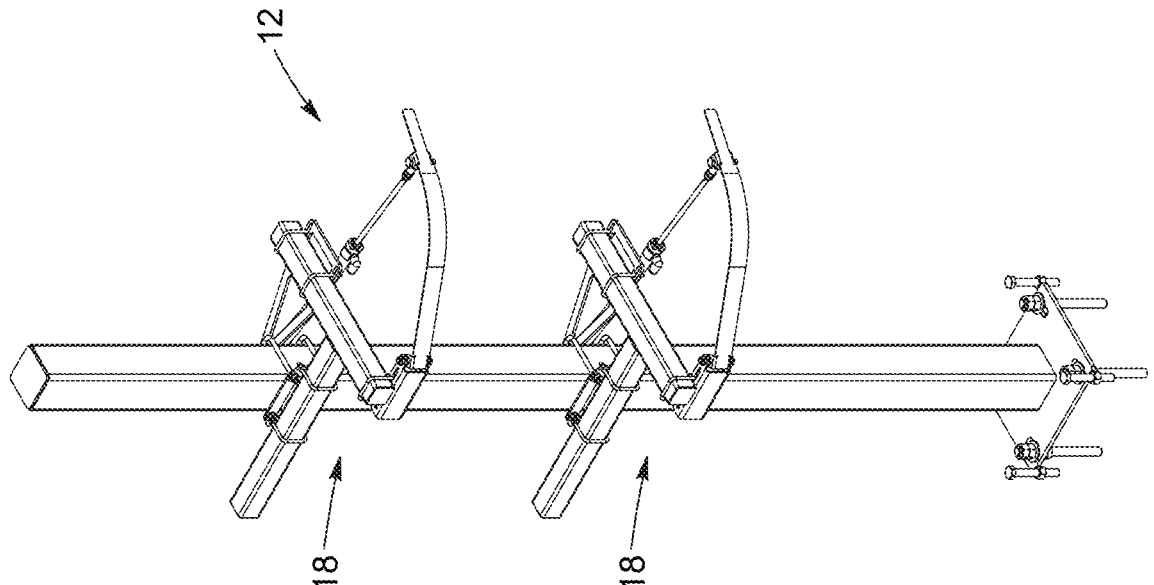
FIG. 11 is a perspective view of a stabilizer according to another embodiment, showing a pair of substantially identical shock absorbers mounted to a same post.

In other example embodiments, the stabilization system can include multiple absorbing stages, for example, with three (3) or more stabilizers installed in a row which could allow more force absorption efficiency. The stabilization system can be configured with stabilizers and/or shock absorbers at different heights (at the same location, or staggered along the processing line) in order to contact and press specific parts of a given carcass, or enable contacting and pressing different sizes/types of carcasses, or both. The stabilization system can be configured with dynamic pressure absorbing units. More specifically, instead of using a constant pressure with every plate, each unit could have a lower pressure for the initial contact of the carcass, which would increase for the second phase of contact, and so on. Alternatively, the stabilization system can be configured with different constant pressures at each stabilizer in order to progressively stabilize the carcass at it is transported past the stabilizers. In yet other possible embodiments, the stabilization system could be equipped with automatic cleaning tools that could sterilize the parts that has contact with the carcass C. The system can be equipped with a device on the opposite side of the shock absorbers to improve stabilization such as one or more conveyors, round bar(s), rollers/wheels, movable cradles, etc. The system can use different shock absorber designs such as a first with a short curved plate and the second with a longer curved plate, or any other combinations. The system could use dynamically moveable shock absorbing components in order to adjust individual units to carcass geometry. A different embodiment of the system can include shock absorbers mounted under the product in order to stabilize it on a different axis (seen in FIGS. 9 and 10). The system could also use multiple shock absorbers at the same location along the processing line but at different vertical height (e.g., seen in FIGS. 6, 8 and 11). The shock absorbers of one or more stabilizers 12 could be identical (e.g., seen in FIG. 11) or configured differently (e.g., seen in FIGS. 5 and 6) in order to contact and press carcasses at different locations and/or apply varying pressures thereon.

In another embodiment, the stabilizers are provided with a single elongated plate, but includes a plurality of shock absorbing devices coupled to the plate and spaced along a length thereof. For instance, and with reference to FIGS. 12 to 17, a stabilization system 100 is shown. In this embodiment, the stabilization system 100 is similar to previous embodiments and includes a stabilizer 112 provided with a shock absorber 118 adapted to absorb at least some of the forces generated from moving (e.g., swinging) carcasses C, an engagement component (e.g., a plate 120) and a shock absorbing device 122 operatively coupled to the plate 120. More specifically, in this embodiment, the stabilizer 112 includes an articulated plate 120a and a plurality of shock absorbing devices 122 distributed along and coupled to the articulated plate 120a. As will be described further below, the articulated plate 120a includes a plurality of interconnected plate sections 150, where each plate section 150 is operatively coupled to one or more of the shock absorbing devices 122. In some embodiments, one or more of the plate sections 150 can be coupled to adjacent plate sections 150, but free from any direct connection with one of the shock absorbing devices 122.

Similar to previously described embodiments, the stabilization system 100 includes the stabilizing surface 14 installed opposite the stabilizer 112 such that the carcasses C are transported along the processing line 5 between the stabilizing surface 14 and the stabilizer 112, where stabilizer is adapted to engage and bias the carcasses C against the stabilizing surface. In other words, the stabilizer 112 can contact the carcass C on a first side thereof, and the stabilizing surface 14 can contact the carcass on a second side thereof (e.g., opposite the first side).

Figure 15:
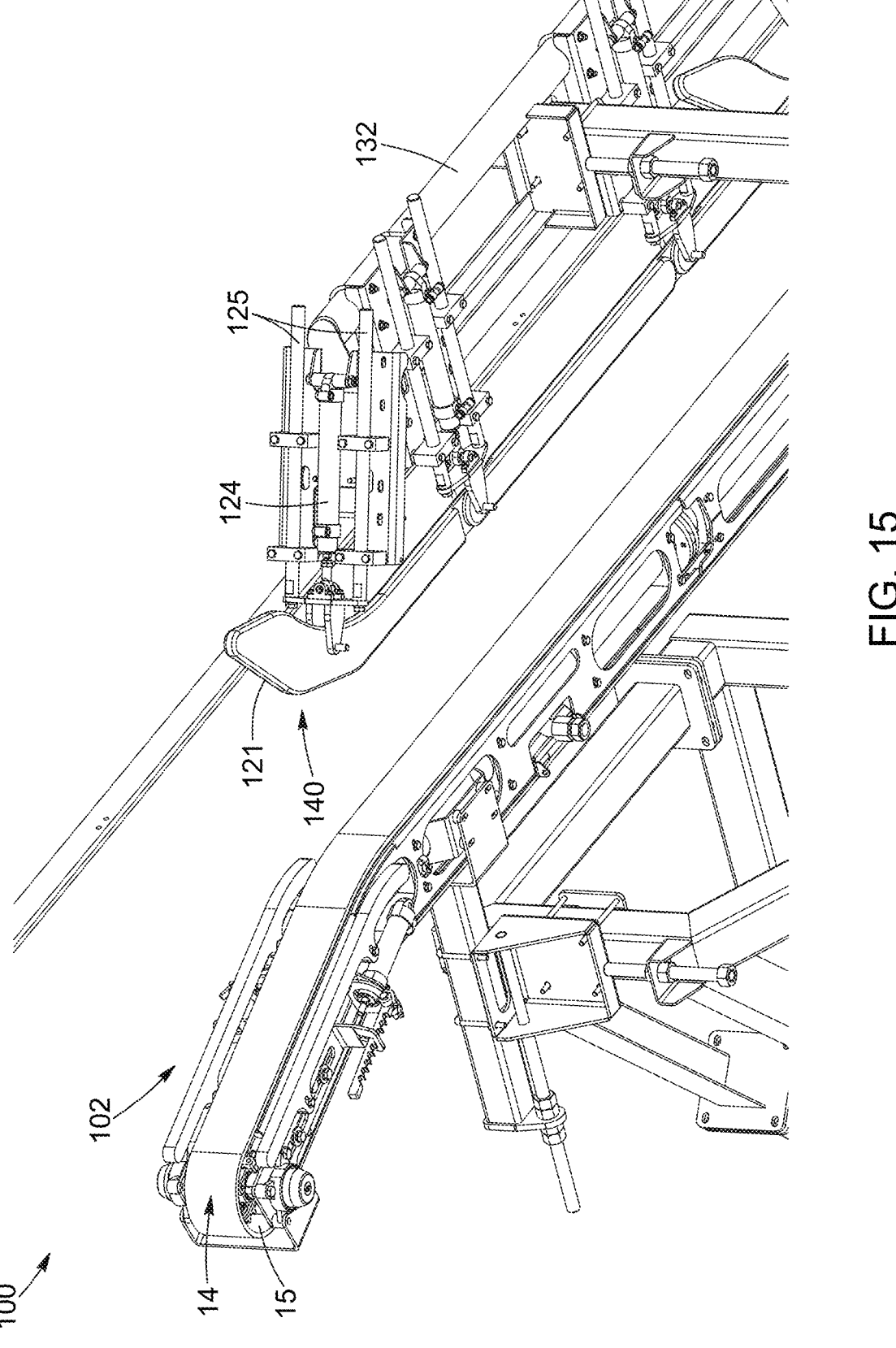
FIG. 15 is a photograph of a portion of the stabilization system shown in FIG. 12, showing one stabilizer and the conveyor.
Figure 16:
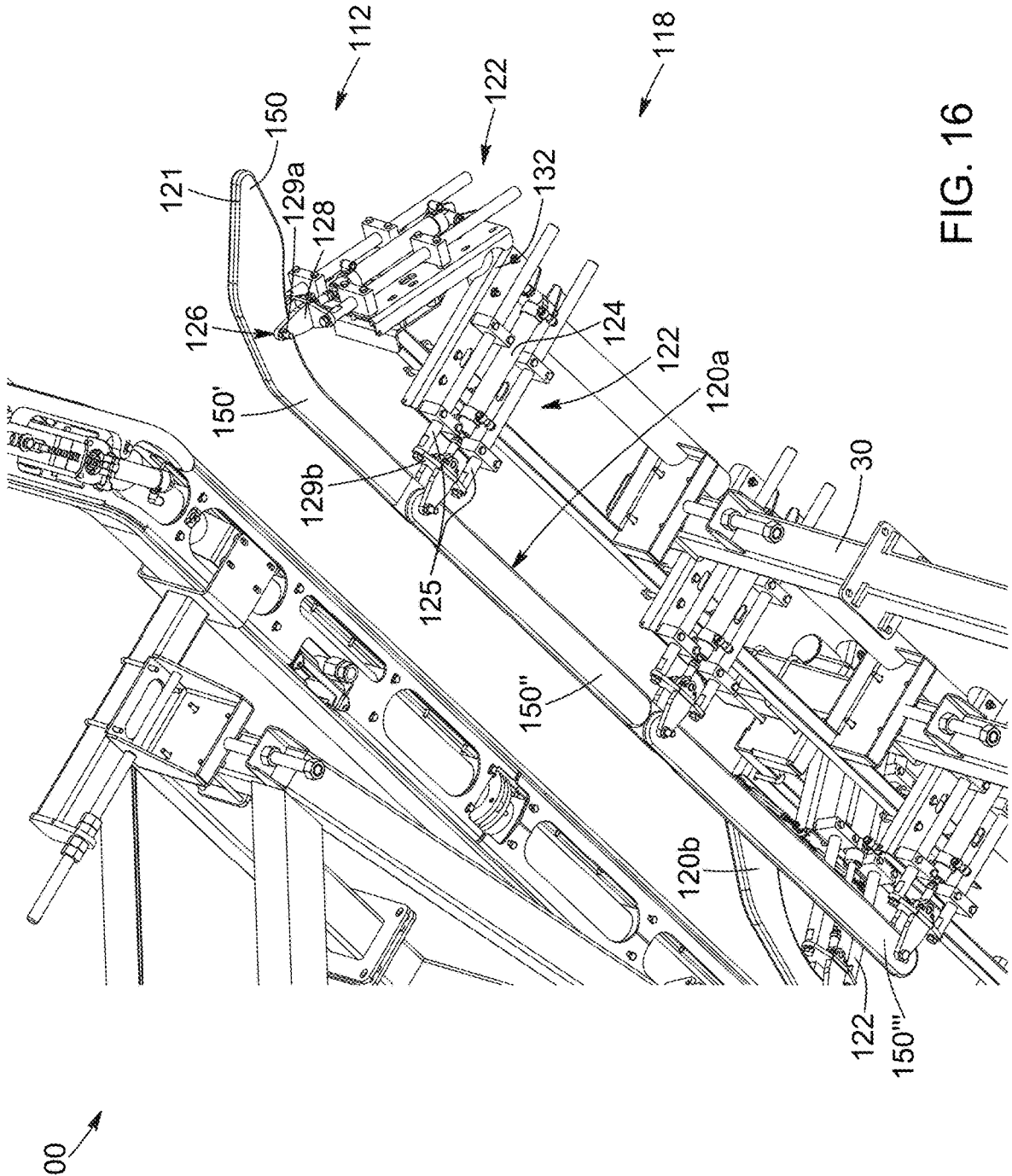
FIGS. 16 and 17 are other photographs of a portion of the stabilization system shown in FIG. 12.

Still referring to FIGS. 12 to 17, the articulated plate 120a defines an engagement surface 121 for engaging with the carcasses C. In this embodiment, the shock absorbing devices 122 are operatively coupled to the articulated plate 120a on a surface opposite the engagement surface 121 (e.g., a rear surface). For instance, and as shown in FIGS. 14 and 16, the stabilizer 112 includes four (4) shock absorbing devices 122 distributed along and coupled to the articulated plate 120a. Each shock absorbing device 122 can be mounted to a common support frame 132 or to respective support frames 132. The shock absorbing devices 122 can be distributed at even or uneven intervals along the articulated plate 120a. In other words, the shock absorbing devices 122 can be equidistant from one another. Similarly, the shock absorbing devices 122 can each be spaced from the processing path by generally the same distance. However, it is appreciated that one shock absorbing device can engage further into the processing path than another shock absorbing device, for example.

In some embodiments, each one of the shock absorbing devices 122 includes at least one pneumatic cylinder 124 and one or more retractable support rods 125. Different shock absorbing devices 122 can have different configurations, such as a different combination of pneumatic cylinder(s) and/or support rod(s). For example, the shock absorbing device 122 closest to an inlet 102 of the stabilization system 100 can include a single pneumatic cylinder 124 and a single retractable support rod 125, while the other shock absorbing devices 122 each include a single pneumatic cylinder 124 and a pair of retractable support rod 125.

In this embodiment, each shock absorbing device 122 includes a connection end portion 126 defining an interface between the shock absorbing device 122 and the articulated plate 120a. As seen in FIG. 16, the connection end portion 126 includes a generally T-shaped connector 128 connected to the articulated plate 120a at a first end thereof (e.g., the tip of the T-shape). The pneumatic cylinder 124 and the one or more retractable support rods 125 can be connected to a second end of the connector 129b, such as along a surface transverse related to the tip. The first end of the connector 129a (e.g., the tip) can be pivotally coupled to the articulated plate 120a so as to not hinder the articulated motion of the articulated plates 120, as will be described further below.

As seen in FIG. 15, in this embodiment, the conveyor 15 and the articulated plate 120a can include respective upstream portions angled outwardly relative to one another to assist in funneling the carcasses into the inlet 102 and along the processing path. In other words, a distance between the stabilizing surface 14 of the conveyor 15 and the engagement surface 121 of the articulated plate 120a is greater proximate the inlet 102 and gradually decreases further along the processing path. In some embodiments, the stabilizing surface 14 and the engagement surface 121 run generally parallel to each other along the processing path following the inlet 102. In the illustrated embodiment, an upstream portion 140 of the articulated plate 120a is arcuate (e.g., curved), as seen in FIG. 15, although other configurations are possible.

Figure 18:
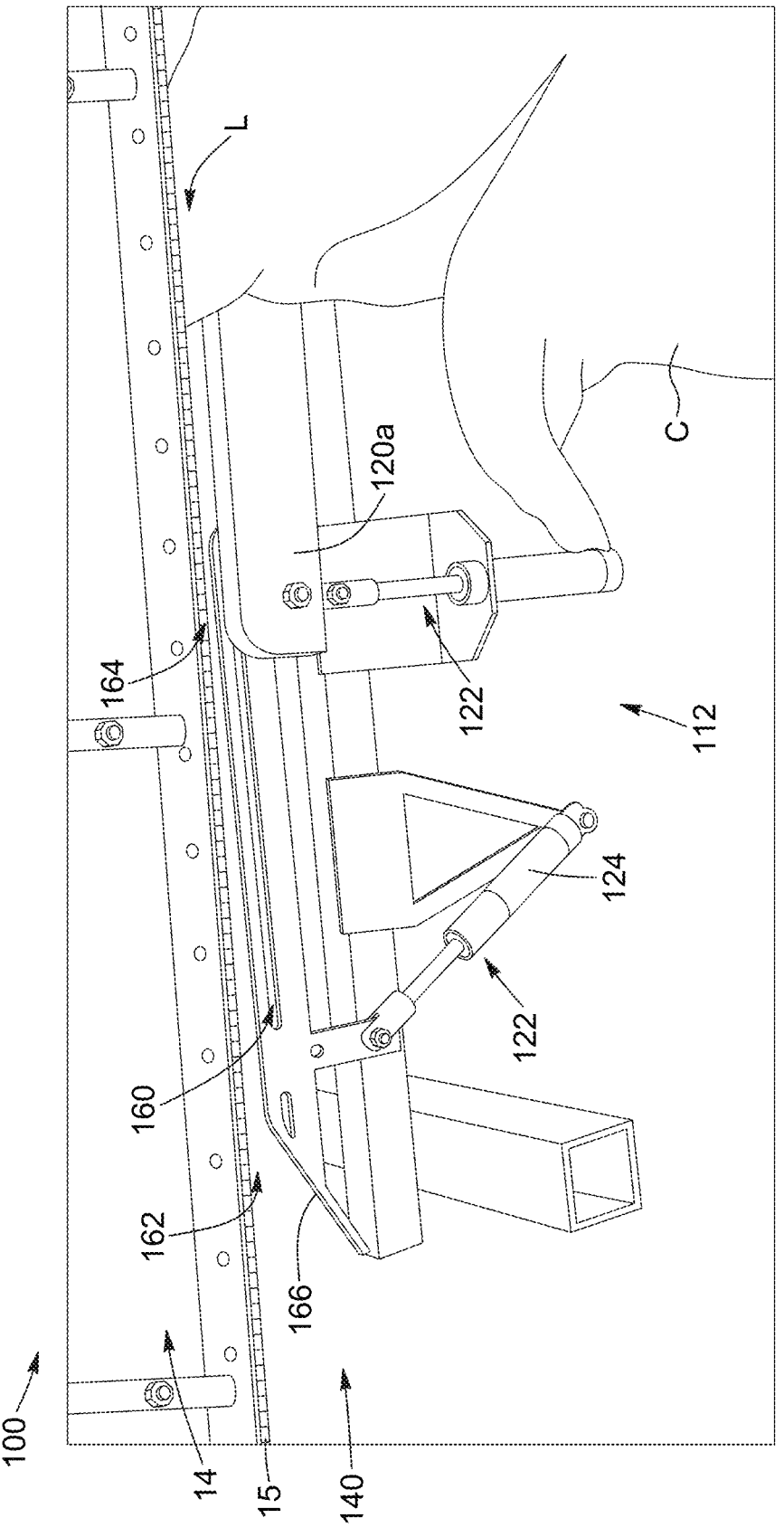
FIG. 18 is a photograph of a portion of a stabilization system in accordance with yet another embodiment, showing a tapered receiving arm, an engagement plate and two shock absorbing devices.

For instance, and with reference to FIG. 18, the upstream portion 140 can include a receiving arm 160 extending outwardly from the articulated plate 120a and having a distal end 162 provided with an angled receiving surface 166 adapted to receive initial impacts from transported carcasses C entering the stabilization system 100. In this embodiment, the distal end 162 of the receiving arm 160 is coupled to one shock absorbing device 122. In addition, the proximal end 164 is coupled to another shock absorbing device 122, which is also coupled to the articulated plate 120a. The proximal end 164 of the receiving arm 160 can be collinear and/or parallel to the lateral conveyor 15.

In this embodiment, the articulated plate 120a includes a plurality of plate sections 150 pivotally coupled to at least one adjacent plate section 150 to enable articulation of the articulated plate 120a. More specifically, the plate sections 150 are connected together in an end-to-end configuration, where each connection includes a pivot to enable relative movement (e.g., rotation/pivoting) between adjacent plate sections 150. In addition, each plate section 150 can be coupled to at least one shock absorbing device 122 via corresponding connection end portions 126. For instance, in the illustrated embodiment of FIG. 16, the articulated plate 120*a* includes three (3) plate sections, namely a first plate section 150', which includes the arcuate upstream portion 140, a second plate section 150" and a third plate section 150'". The second articulated section 150" is coupled between the first and third plate sections, and therefore defines a middle portion of the articulated plate 120*a*. In this embodiment, the second plate section 150" is coupled to two connection end portions 126 of respective shock absorbing devices 122. The same two connection end portions 126 are also pivotally coupled to the first and third plate sections 150', 150", respectively. It should thus be noted that the shock absorbing devices 122 are coupled, via the connection end portions 126, to the pivoting joints between adjacent plate sections 150. However, it is appreciated that other configurations are possible, such as providing connection end portions 126 (and corresponding shock absorbing devices) at any other suitable location along the plate sections 150.

In some embodiments, the shock absorbing device 122 coupled to the first articulated section 150' (e.g., proximate the inlet 102) can be adapted to apply a lower pressure compared to the shock absorbing devices 122 coupled to the other plate sections 150. This configuration can enable the application of progressively greater pressures/forces on the carcasses C as they are transported along the processing path. Alternatively, or additionally, it is noted that the pneumatic cylinder 124 of the first articulated section 150' is angled (e.g., non-perpendicular) relative to the stabilizing surface 14. More particularly, the pneumatic cylinder 124 of the first articulated section 150' is oriented away from first articulated plate 120*a* and towards the inlet 102. This configuration can assist in absorbing an initial impact from carcasses thereby reducing (or eliminating) the subsequent swinging motion of the carcass C as it enters the stabilization system 100.

In this embodiment, each pneumatic cylinder 124 can be disposed in a predetermined position, with the shock absorbing device 122 being configured to revert the pneumatic cylinder 124 to its predetermined position (e.g., after being subjected to impacts from carcasses). Each pneumatic cylinder 124 can thus be independently extended or contracted to the predetermined position. In other words, the length of the pneumatic cylinder when in the predetermined position can be different from one shock absorbing device 122 to the next. It is thus noted that the articulated plate 120*a* can be relatively initially straight, where each pneumatic cylinder extends by substantially the same length in respective predetermined positions. Alternatively, the articulated plate 120*a* can be initially "kinked", where the pneumatic cylinders extend by different lengths, resulting in the configuration shown in FIG. 17, for example. It should be noted that, as used herein, the expression "predetermined position" when used with regards to the pneumatic cylinders and/or the shock absorbing devices can refer to the position of these components "at rest" and/or when no forces are being applied thereon.

Broadly referring to FIGS. 12 to 17, the stabilization system 100 can include a pair of articulated plates, such as a first articulated plate 120*a* and a second articulated plate 120*b*. The first and second articulated plates 120*a*, 120*b* can be positioned adjacent one another, such as disposed in an end-to-end configuration, along the processing path. In some embodiments, the first and second articulated plates 120*a*, 120*b* can overlap along a portion thereof to enable a smoother transition of the carcasses from the first articulate plate to the second articulated plate. The configuration of the first and second articulated plates can be generally the same. For example, each articulated plate can include a plurality of plate sections 150 operatively coupled to shock absorbing devices 122. In the illustrated embodiment, the first articulated plate 120*a* includes three (3) plate sections 150, whereas the second articulated plate 120*b* includes four (4) plate sections. However, it is appreciated that other configurations are possible and that any other suitable number of articulated plates having any other suitable number of plate sections can be used. It should also be noted that the articulated plates can be positioned subsequently to one another (as seen in FIGS. 12 to 17), face-to-face, aligned with one another, staggered relative to one another along the processing line, spaced from one another, parallel to one another, transverse relative to one another, positioned at different heights, among other possible configurations.

Figure 17:
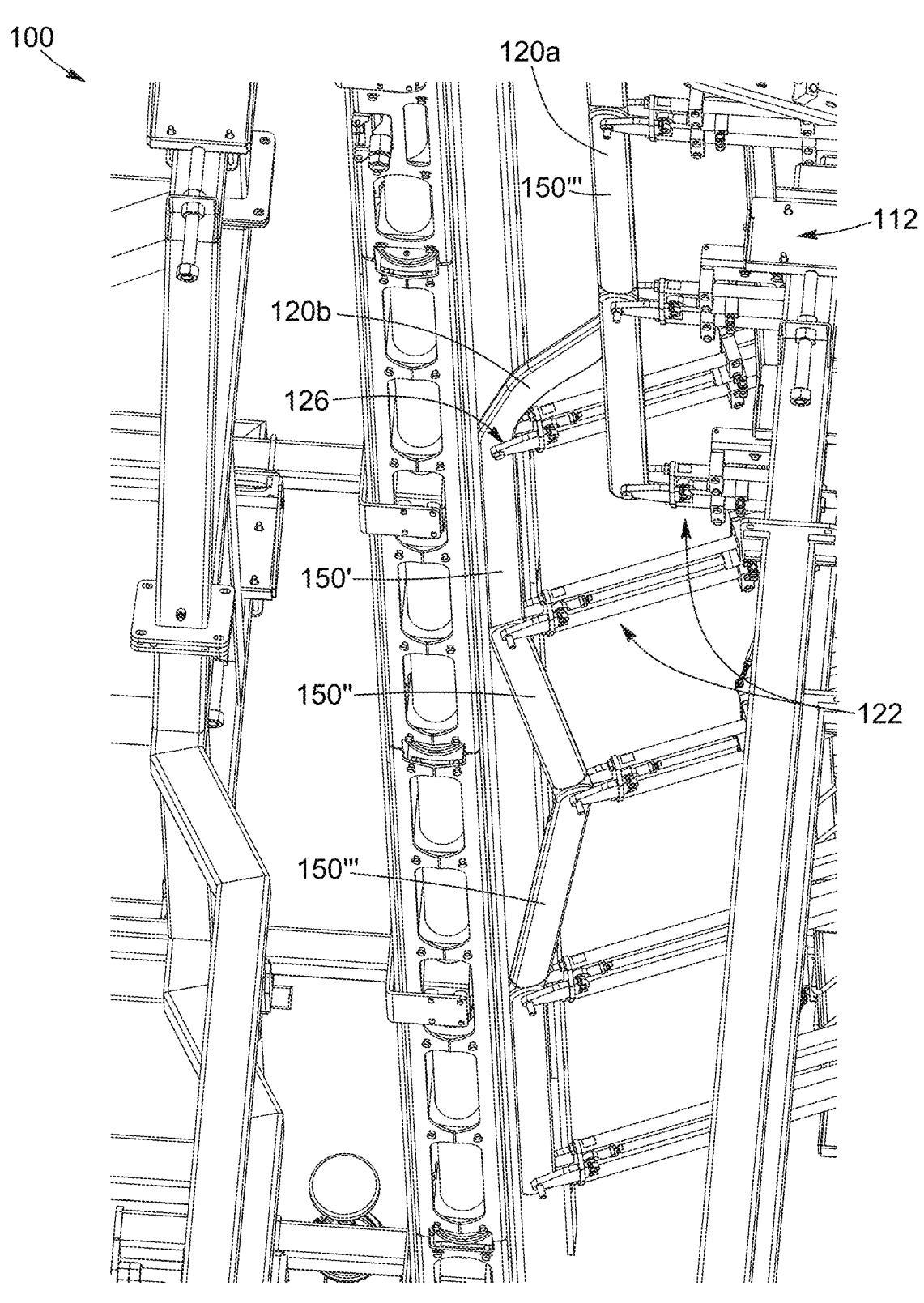

In some embodiments, the shock absorbing devices 122 are configured to maintain each articulated plate in respective predetermined configurations by having each plate section 150 in respective predetermined positions. Referring to FIGS. 16 and 17, the shock absorbing devices 122 coupled to the first articulated plate 120*a* are configured to have the first articulated plate 120*a* be spaced-apart from the stabilizing surface 14 by a first distance. Similarly, the shock absorbing devices 122 coupled to the second articulated plate 120*b* are configured to have the second articulated plate 120*b* be spaced-apart from the stabilizing surface 14 by a second distance. In this embodiment, the second distance is shorter than the first distance such that the carcasses are further squeezed and stabilized along the second articulated plate. This increased stabilization can be useful for performing various operations, such as cutting, carving, deboning, cleaning, etc., and avoiding, at least partially, inducing unwanted movement to the carcass.

The first plate section 150' of the second articulated plate 120*b* can have an arcuate or angled portion to move the carcasses C closer to the stabilizing surface 14. The arcuate portion can at least partially overlap the third plate section 150'" of the first articulated plate 120*a* (e.g., the last plate section of the first articulated plate) to define a transition between the first and second articulated plates. As seen in FIG. 12, the stabilization system 100 can have an outlet 104 or downstream end through which the carcasses C exit the stabilization system 100. In this embodiment, the conveyor 15 and the second articulated plate 120*b* can include respective downstream portions angled outwardly relative to one another to assist in releasing the carcasses from the stabilization system 100.

It is appreciated that the stabilization system 100 can correspond to a dual-stage stabilization system, with a first stabilization stage occurring along the first articulated plate 120*a*, and a second stabilization stage occurring along the second articulated plate 120*b*. However, it is also noted that additional articulated plates (e.g., a third, a fourth, etc.) are possible and can be implemented to define additional stages of stabilization. the articulated plates allow for a generally constant contact with the carcasses being transported along the processing line. The articulated plates are adapted to, via the interconnected plate sections 150, dynamically move to better adapt to the carcasses being transported along the processing line. The dynamic movement of the articulated plates can be based on the movement (e.g., swinging, rotation, etc.) and/or parameters (e.g., geometry, size, weight, etc.) of each carcass.

In some embodiments, the relative position between the stabilizers and the carcasses can be adjusted in order to have a specific part of the carcasses contact the stabilizers and the conveyor 15. For example, the hooks and/or chains used to transport the carcasses can be adapted to adjust a hanging distance of each carcass C in order to align the specific or desired part of the carcass with the conveyor and/or stabilizers. As seen in FIGS. 14 and 18, in some embodiments, the stabilizer 112 and the stabilizing surface 14 of the conveyor 15 are configured to engage a portion of a leg or a shank portion of the carcass. This portion of the carcass, for instance, with reference to pig carcasses, is typically characterized by an oblong cross-sectional shape (hereinafter referred to as the "oblong leg portion" L of the carcass C). It should be noted that, as referenced herein, the oblong leg portion L of the carcass C is located proximate a lower end of the carcass leg, or proximate a foot or hoof of the carcass, although other locations are possible. It should also be understood that the shape of the leg portion can vary from a general oblong shape, and can take an oval shape, for instance.

As carcasses are transported along the processing line, the oblong leg portion L is squeezed between the conveyor 15 and the articulated plate 120*a*, and because of the shape of the oblong leg portion L, the carcass C is made to swivel about its hanging point until the carcass is oriented in a desired manner. In this embodiment, the pressure applied to the oblong leg portion L by the stabilizer 112 induces rotation of the carcass such that the length of the oblong leg portion L is substantially aligned with the travel direction of the processing line 5. In this orientation, a larger surface area of the carcass is held in contact with the conveyor 15 by forces generated by the stabilizer 112 which can improve synchronization between the travel speed of the carcass and the operational speed of the conveyor 15. It should also be noted that pushing the oblong leg portion L onto the conveyor avoids potential pendulum effects caused by friction, for example, if the stabilization system had a fixed bar or gliding surface (i.e., instead of the conveyor) paired with the stabilizer on the other side.

By pushing against the oblong leg portion L, the carcasses can subsequently and more consistently be oriented as desired in the processing line to provide a more homogeneous carcass positioning and facilitate subsequent processing. This configuration (e.g., the homogeneous carcass positioning) can also assist in performing other operations, such as using an image capture device prior to cutting into the carcass. Therefore, the stabilization system 100 can facilitate processing for a computer vision system while also maintaining the carcass in the desired orientation throughout the cutting operations.

In another embodiment, the stabilization system is provided with a single flexible engagement component. For instance, and with reference to FIGS. 19 to 20, a stabilization system 1000 is shown. In this embodiment, the stabilization system 1000 is similar to previous embodiments and includes a stabilizer 1112 provided with shock absorbing devices 1122 adapted to absorb at least some of the forces generated from moving (e.g., swinging) carcasses and an engagement component 1120. More specifically, in this embodiment, the engagement component 1120 includes a flexible chain 1150 and a plurality of shock absorbing devices 1122 distributed along and coupled to the flexible chain 1150.

Similar to previously described embodiments, the stabilization system 1000 includes the stabilizing surface 14 installed opposite the stabilizer 1112 such that the carcasses are transported along the processing line between the stabilizing surface 14 and the stabilizer 1112, where the stabilizer 1112 is adapted to engage and bias the carcasses against the stabilizing surface 14. In other words, the stabilizer 1112 can contact the carcass on a first side thereof, and the stabilizing surface 14 can contact the carcass on a second side thereof (e.g., opposite the first side).

Figure 19:
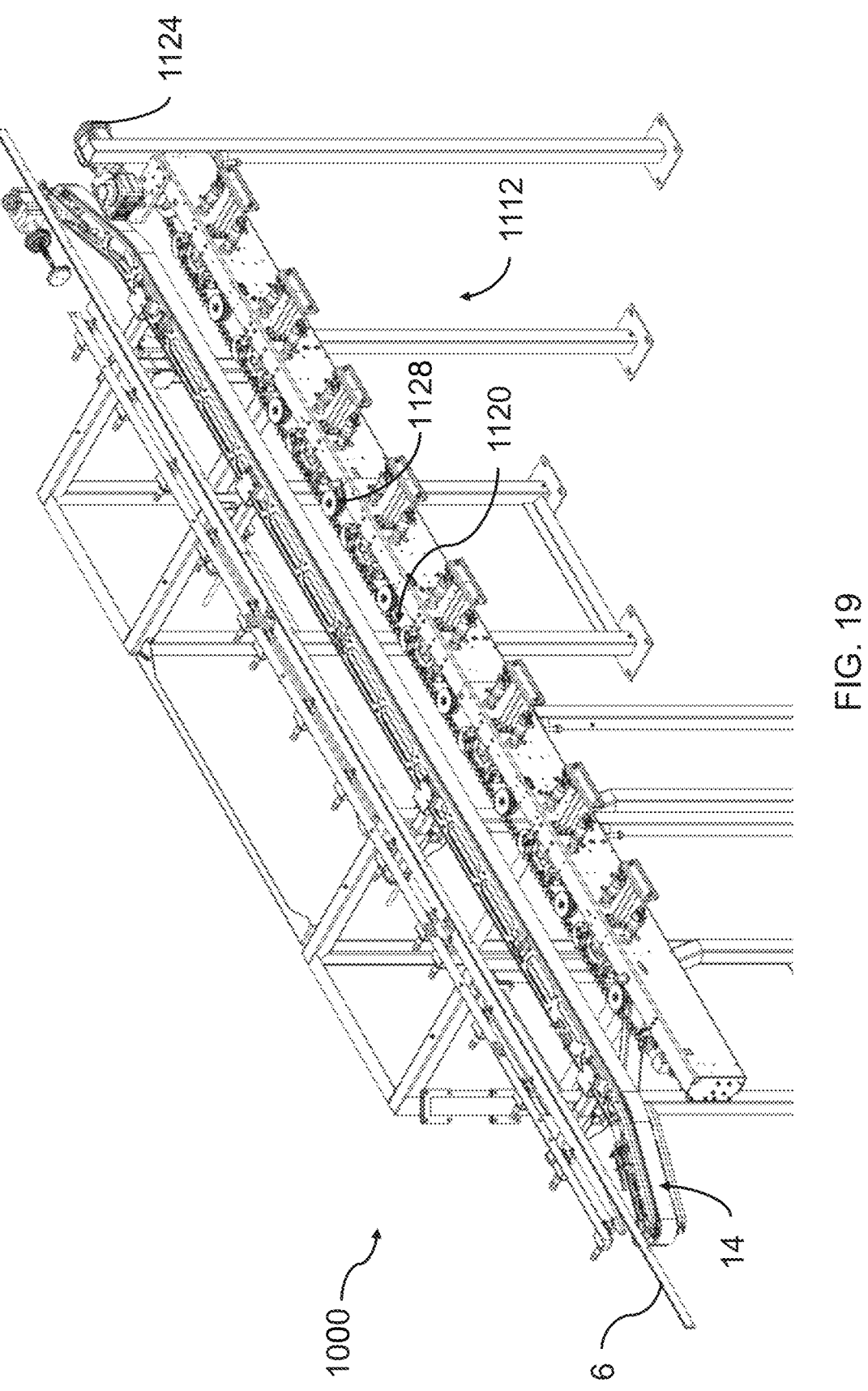
FIG. 19 is a perspective view of a stabilization system in accordance with yet another embodiment, showing stabilizers provided with a conveyor chain.
Figure 20:
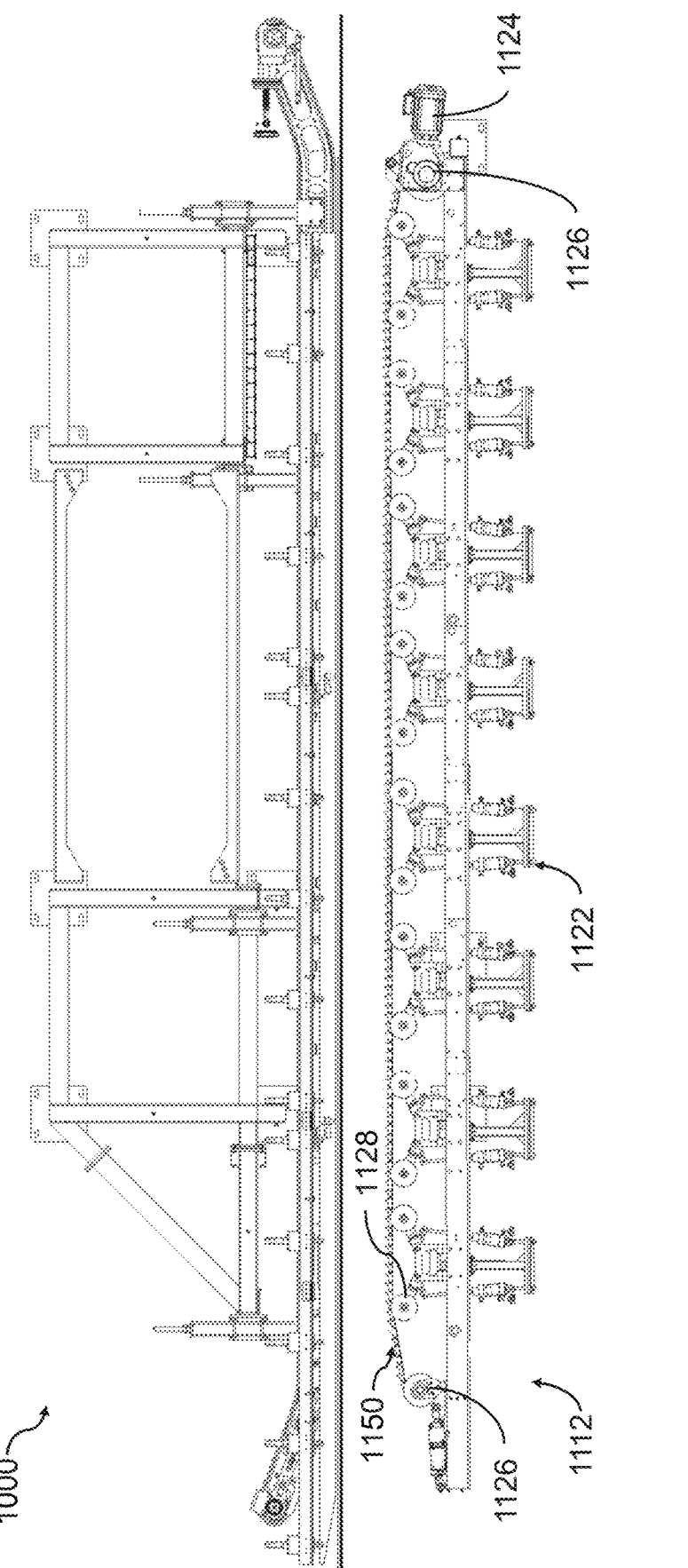
FIG. 20 is a top plan view of the stabilization system shown in FIG. 19, showing the stabilizers cooperating with a common conveyor chain.

Still referring to FIGS. 19 and 20, the flexible chain 1150 can extend for generally an entire length of the stabilization system 1000 for engaging with the carcasses. In this embodiment, the shock absorbing devices 1122 are operatively coupled to the flexible chain 1150 to absorb at least some of the forces generated from moving (e.g., swinging) carcasses and bias the carcasses against the stabilizing surface 14. It is appreciated that the flexible chain 1150 can be adapted to conform to the shape of each carcasses individually, increasing the number of contact points with the carcasses, thus improving the stabilization provided.

In some embodiments, the flexible chain 1150 can be relatively static in the travel direction of the carcasses, and configured to move towards and away from the stabilizing surface 14. In other words, the flexible chain 1150 can be configured to move transversely relative to the processing line. In other embodiments, and as shown in FIGS. 19 and 20, the flexible chain 1150 can be coupled to one or more driver wheels 1126 to enable movement of the flexible chain 1150. More particularly, the driver wheels 1126 can rotate to urge the flexible chain (e.g., in the direction of travel of the carcasses) to assist in conveying the carcasses along the processing line. The flexible chain 1150 can therefore be adapted to function as a secondary conveyor, opposite the conveyor defining the stabilizing surface 14.

The stabilizer 1112 can also include chain rollers 1128 distributed along a length of the conveyor chain 1150 and a chain motor 1124 operatively coupled to the driver wheels 1126 to engage same in rotation. It should also be noted that the chain rollers 1128 can be operatively connected to respective shock absorbing devices 1122, similar to previously described embodiments (e.g., see FIGS. 12 to 17). During operation, that is, during rotation of the driver wheels 1126, the flexible chain 1150 revolves and moves along the conveyor rollers 1128, which guides the flexible chain, to assist in displacing the carcass in the travel direction.

The present disclosure may be embodied in other specific forms without departing from the subject matter of the claims. The described example embodiments are to be considered in all respects as being only illustrative and not restrictive. For example, as described herein, the articulated plate includes a plurality of interconnected plate sections pivotally connected to one another. However, it is appreciated that the shape and size of each plate section can differ from what is shown in the Figures. For instance, the plate sections can be wider or narrower, longer or shorter, and generally bigger or smaller. The shape of each plate section can also be different. In an alternate embodiment, the engagement component can correspond to a chain made up of a plurality of chain sections which are articulated from one another along the stabilizer. Each chain section can have any suitable shape (e.g., circular, oval, oblong, stadium-shaped, etc.) and size (e.g., big, small, wide, long, short, etc.).

Moreover, in the context of the present description, expressions such as "can", "may", "might", "will", "could", "should", "would", etc., may also be used interchangeably, whenever appropriate, as also apparent to a person skilled in the art.

In the context of the present description, it will be considered that all elongated objects will have an implicit "longitudinal axis" or "centerline", such as the longitudinal axis of shaft for example, or the centerline of a coiled spring, for example, and that expressions such as "connected" and "connectable", or "mounted" and "mountable", may be interchangeable. Similarly, the terms "coupled", "coupling", "attached", "connected" or variants thereof as used herein can have several different meanings depending in the context in which these terms are used. For example, the terms coupled, coupling, connected or attached can have a mechanical connotation. For example, as used herein, the terms coupled, coupling or attached can indicate that two elements or devices are directly connected to one another or connected to one another through one or more intermediate elements or devices via a mechanical element depending on the particular context.

Moreover, components of the present system(s) and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

Furthermore, although the various exemplary embodiments described herein may be used in relation with stabilizing an animal carcass, for example, it is understood that it may be used with other types of carcasses, products and/or for other purposes. For this reason, the term "product" as used herein should not be taken as to limit the scope of the present disclosure as being used for animal carcasses in particular.

In the present disclosure, an embodiment is an example or implementation of the stabilization system. The various appearances of "one embodiment," "an embodiment" or "some embodiments" do not necessarily all refer to the same embodiments. Although various features may be described in the context of a single embodiment, the features may also be provided separately or in any suitable combination. Conversely, although the stabilization system may be described herein in the context of separate embodiments for clarity, it may also be implemented in a single embodiment. Reference in the specification to "some embodiments", "an embodiment", "one embodiment", or "other embodiments", means that a particular feature, structure, or characteristic described in connection with the embodiments is included in at least some embodiments, but not necessarily in all embodiments.

In the above description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom.

In addition, although the optional configurations as illustrated in the accompanying drawings comprises various components and although the optional configurations of the stabilization system, and corresponding components, as shown may consist of certain geometrical configurations as explained and illustrated herein, not all of these components and geometries are essential and thus should not be taken in their restrictive sense, i.e. should not be taken as to limit the scope of the present disclosure. It is to be understood that other suitable components and cooperations thereinbetween, as well as other suitable geometrical configurations may be used for the implementation and use of the stabilization system, and corresponding parts, as briefly explained and as can be easily inferred herefrom, without departing from the scope of the disclosure.

The invention claimed is:

1. A stabilization system for products being transported along a processing line, comprising:
   a stabilizing surface extending along the processing line and along which the products are transported; and
   a stabilizer installed proximate the processing line opposite the stabilizing surface, the stabilizer comprising:
      an articulated engagement component having a plurality of stabilizer sections pivotally coupled to one another along the processing line, each stabilizer section being adapted to engage the products; and
      a plurality of shock absorbing devices operatively coupled to the plurality of stabilizer sections and dynamically operable to generate a pressure on the plurality of stabilizer sections as the products are transported along the processing line to push the products against the stabilizing surface.

2. The stabilization system of claim 1, wherein each shock absorbing device comprises a pneumatic cylinder configured to generate the pressure on the plurality of stabilizer sections in order to position each stabilizer section in a predetermined position relative to at least one of the stabilizing surface and the products being transported.

3. The stabilization system of claim 2, wherein the pressure is substantially constant.

4. The stabilization system of claim 2, wherein the predetermined position includes a predetermined distance between each stabilizer section and the stabilizing surface.

5. The stabilization system of claim 4, wherein the predetermined distance is the same for each stabilizer section.

6. The stabilization system of claim 2, wherein the pneumatic cylinder comprises a pneumatic cylinder rod and a pneumatic cylinder housing, and wherein the pneumatic cylinder rod is adapted to:
   retract within the pneumatic cylinder housing as the products contact corresponding stabilizer sections; and
   extend out of the pneumatic cylinder housing to apply the pressure on the stabilizer section to push the product against the stabilizing surface.

7. The stabilization system of claim 1, wherein the stabilizing surface comprises a conveyor belt adapted to urge the products in the direction of the processing line.

8. The stabilization system of claim 1, wherein the plurality of shock absorbing devices extend perpendicularly relative to the at least one stabilizer section operatively coupled thereto.

9. The stabilization system of claim 1, wherein each stabilizer section of the plurality of stabilizer sections are pivotally coupled to adjacent stabilizer sections defining pivot points, and wherein the plurality of shock absorbing devices are coupled to the plurality of stabilizer sections at the pivot points.

10. The stabilization system of claim 1, wherein the plurality of stabilizer sections comprises an upstream stabilizer section having a distal end extending at an angle relative to the stabilizing surface.

11. The stabilization system of claim 10, wherein the distal end extends away from the stabilizing surface defining a wider upstream portion of the stabilization system.

12. The stabilization system of claim 10, wherein the plurality of shock absorbing devices comprises an upstream shock absorbing device operatively coupled to the distal end of the upstream stabilizer section.

13. The stabilization system of claim 12, wherein the upstream shock absorbing device is perpendicular relative to the distal end of the upstream stabilizer section.

14. The stabilization system of claim 10, wherein the distal end of the upstream stabilizer section is arcuate, and wherein a proximal end of the upstream stabilizer section is generally parallel to the stabilizing surface.

15. The stabilization system of claim 1, wherein the stabilizer is a first stabilizer, and the stabilization system further comprises a second stabilizer installed adjacent the first stabilizer along the processing line, the first and second stabilizers defining a dual-stage stabilization sequence where the first and second stabilizers engage the products simultaneously or in succession.

16. The stabilization system of claim 15, wherein the first and second stabilizers are identical.

17. The stabilization system of claim 1, wherein the articulated engagement component and the stabilizing surface are configured to squeeze the products therebetween.

18. The stabilization system of claim 17, wherein the products include animal carcasses, and the articulated engagement component and the stabilizing surface are configured to squeeze a predetermined portion of the animal carcasses to provide substantially consistent carcass orientation along the processing line.

19. The stabilization system of claim 18, wherein the predetermined portion of the animal carcass has an oblong cross-sectional shape having a greater length than width, and wherein squeezing the predetermined portion orients the animal carcasses to align the length of the predetermined portion with the processing line.

20. A stabilization system for products being transported along a processing line, comprising:

a stabilizing surface extending along the processing line and along which the products are transported; and a stabilizer installed proximate the processing line opposite the stabilizing surface, the stabilizer comprising:

a flexible engagement component extending along the processing line and adapted to engage the products generally constantly along a length of the flexible engagement component; and a plurality of shock absorbing devices operatively coupled to the flexible engagement component and dynamically operable to generate a pressure on the flexible engagement component as the products are transported along the processing line to push the products against the stabilizing surface.

* * * * *